United States Patent [19]
Fujita et al.

[11] Patent Number: 5,992,255
[45] Date of Patent: Nov. 30, 1999

[54] CONTROL APPARATUS FOR HYDRAULICALLY OPERATED VEHICULAR TRANSMISSION

[75] Inventors: Hironori Fujita; Osahide Miyamoto; Kouji Shibuya; Yoshiaki Shuto; Hiroyuki Takeo; Hiroyuki Katano, all of Tochigi-ken, Japan

[73] Assignee: Honda Giken Kogyo Kabushiki Kaisha, Tokyo, Japan

[21] Appl. No.: 09/129,226

[22] Filed: Aug. 5, 1998

[30]    Foreign Application Priority Data

Aug. 28, 1997 [JP] Japan .................................... 9-233052

[51] Int. Cl.[6] .................................................. F16H 61/00
[52] U.S. Cl. ................................................ 74/335; 477/98
[58] Field of Search ................................. 74/335; 477/98

[56]           References Cited

U.S. PATENT DOCUMENTS

| | | | |
|---|---|---|---|
| 4,998,449 | 3/1991 | Baba et al. | 477/98 |
| 5,058,014 | 10/1991 | Saitou et al. | 477/98 |
| 5,345,843 | 9/1994 | Fujita et al. | 477/98 |
| 5,518,468 | 5/1996 | Sametz et al. | 477/98 |

*Primary Examiner*—Dirk Wright
*Attorney, Agent, or Firm*—Armstrong, Westerman, Hattori, McLeland & Naughton

[57]           ABSTRACT

In a control apparatus for a hydraulically operated vehicular transmission having a plurality of speed stages to be established by a selecting operation of a plurality of hydraulic clutches, when a command to downshift to G(N−2) is issued in the course of downshifting to G(N−1) and a flag FTBD is set to 1, a control is performed to accelerate the time of completion of the downshifting control to G(N−1). When that oil temperature in the transmission which is detected by an oil temperature sensor is lower than a predetermined value, the setting of FTBD to 1 is prohibited. Therefore, at the time of low oil temperature, the downshifting to G(N−1) is performed in an ordinary manner. At the time of starting of the downshifting control from G(N−1) to G(N−2), the hydraulic pressure in the hydraulic clutch for the speed stage G(N−1) is sufficiently increased. A smooth downshifting to G(N−2) can thus be smoothly performed without the occurrence of excessive engine racing.

1 Claim, 9 Drawing Sheets

FIG. 5 A

| MAT | | CONTROL MODE |
|---|---|---|
| Hi | Lo | |
| A | 0 | 1ST SOLENOID PROPORTIONAL VALVE $17_1$ HIGH<br>2ND SOLENOID PROPORTIONAL VALVE $17_2$ LOW |
| 0 | B | 1ST SOLENOID PROPORTIONAL VALVE $17_1$ LOW<br>2ND SOLENOID PROPORTIONAL VALVE $17_2$ HIGH |
| A | B | UNDER SHIFT CHANGING |

FIG. 5 B

| MDN | | CONTROL MODE |
|---|---|---|
| ON | OFF | |
| 0 | 0 | OTHER THAN DOWNSHIFTING |
| 1 | — | RESPONSE PRESSURE MODE |
| 2 | — | LOW PRESSURE CORRECTION MODE |
| 3 | — | SYNCHRONOUS MODE |
| 4 | — | END MODE |
| — | 1 | INITIAL PRESSURE MODE |
| — | 2 | LOW PRESSURE HOLDING MODE |
| — | 3 | TAIL MODE |
| — | 4 | END MODE |

CONTROL APPARATUS FOR HYDRAULICALLY OPERATED VEHICULAR TRANSMISSION

BACKGROUND OF THE INVENTION

1. Field of the Invention

The present invention relates to a control apparatus for a hydraulically operated vehicular transmission having a plurality of speed stages to be established by a selecting operation of a plurality of hydraulic engaging elements. In this specification, the term "vehicular transmission" means a transmission for a vehicle such as a motor vehicle.

2. Description of the Related Art

As this kind of control apparatus, there is conventionally known one having means for controlling stepwise speed changing for downshifting one stage at a time such that during downshifting control to one speed stage which is one stage lower, upon receipt of a downshifting command to another speed stage which is one stage lower than said one speed stage, a start of downshifting control to said another speed stage is delayed until the downshifting control to said one speed stage is completed.

In this kind of control system for stepwise speed changing, downshifting to a two-stage lower speed stage which is required by the driver of the vehicle, e.g., from the fourth speed stage to the second speed stage, is performed in two downshifting operations of fourth speed→third speed and third speed→second speed. It has therefore an advantage in that speed change shocks are reduced and that the control system can be simplified. On the other hand, since the downshifting is performed one step at a time, the time for speed changing becomes longer than the one in which downshifting is performed directly to the two-stage lower speed stage. Therefore, it sometimes causes the driver to feel that the time lag in the switching of the driving force is large.

As a solution, the applicants of the present invention earlier proposed in Japanese Patent Application No. 253633/1996 the following. Namely, there is provided means for switching a control mode which performs a control to accelerate the time of completion of the downshifting control to one speed stage upon receipt of a downshifting command to another speed stage which is one stage lower than said one speed stage, the downshifting command being issued during the downshifting control to said one speed stage. The downshifting to said one speed stage is thus completed earlier in order to shorten the time of completion of downshifting to said another speed stage.

When the temperature of oil in the transmission is low, the viscosity of the oil becomes high. Therefore, a longer time is required from the time when a control signal has been issued to the time when actual hydraulic pressure in the hydraulic engaging element changes to the hydraulic pressure according to the control signal. As a result, if a control to shorten the time of completion of the downshifting to said one speed stage is performed, the downshifting control to said another speed stage is started before the hydraulic pressure of the hydraulic engaging element to be engaged at the time of downshifting to said one speed stage has sufficiently be increased. The engine will consequently give rise to an excessive racing to thereby cause large shocks.

In view of the above point, the present invention has an object of providing an improvement over the earlier proposed apparatus, in which the occurrence of shocks at the time of low oil temperature can be prevented.

SUMMARY OF THE INVENTION

In order to attain the above and other objects, the present invention is a control apparatus for a hydraulically operated vehicular transmission having a plurality of speed stages to be established by a selecting operation of a plurality of hydraulic engaging elements, said apparatus comprising: means for controlling stepwise speed changing for downshifting one stage at a time such that during downshifting control to one speed stage which is one stage lower, upon receipt of a downshifting command to another speed stage which is one stage lower than said one speed stage, a start of downshifting control to said another speed stage is delayed until the downshifting control to said one speed stage is completed; and means for switching a control mode which performs a control to accelerate the time of completion of the downshifting control to said one speed stage, said control being made upon receipt of that downshifting command to said another speed stage which is issued during the downshifting control to said one speed stage; characterized in that said control apparatus further comprises: oil temperature detecting means for detecting a temperature of oil in the transmission; and prohibiting means for prohibiting the control by said means for switching the control mode when the detected oil temperature is below a predetermined value.

According to the present invention, when the oil temperature is low, downshifting to said one speed stage is performed in an ordinary manner. Therefore, the hydraulic pressure in the hydraulic engaging element to be engaged at the time of downshifting to said one speed stage is sufficiently increased at the time of starting the downshifting control to said another speed stage. As a result, the downshifting to said another speed stage can be performed without the occurrence of an excessive engine racing, whereby the shocks at the time of low oil temperature can be prevented.

In the embodiment to be described hereinafter, what corresponds to the above-described means for controlling stepwise speed changing is the downshifting control as shown in FIG. 7. What corresponds to the above-described means for switching the control mode is the processing in steps S26, S32 to look at the value of a flag FTBD which is set to "1" when a command to downshift to said another speed stage G(N−2) is issued during the downshifting control to said one speed stage G(N−1) by the processing in FIG. 9. What corresponds to the above-described prohibiting means is the processing in the steps S100 and S104 in FIG. 9. Further, in the embodiment to be described hereinafter, the oil temperature detecting means is constituted by an oil temperature sensor which detects the temperature of the oil in the transmission. It may however be constituted by a sensor to indirectly detect the oil temperature based on the cooling water temperature in the engine, the time of lapse after the engine has been started, or the like.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 5A and FIG. 5B are diagrams to show the relationship among various monitor values to be used in speed change control and control mode;

DETAILED DESCRIPTION OF A PREFERRED EMBODIMENT

Figure 1:
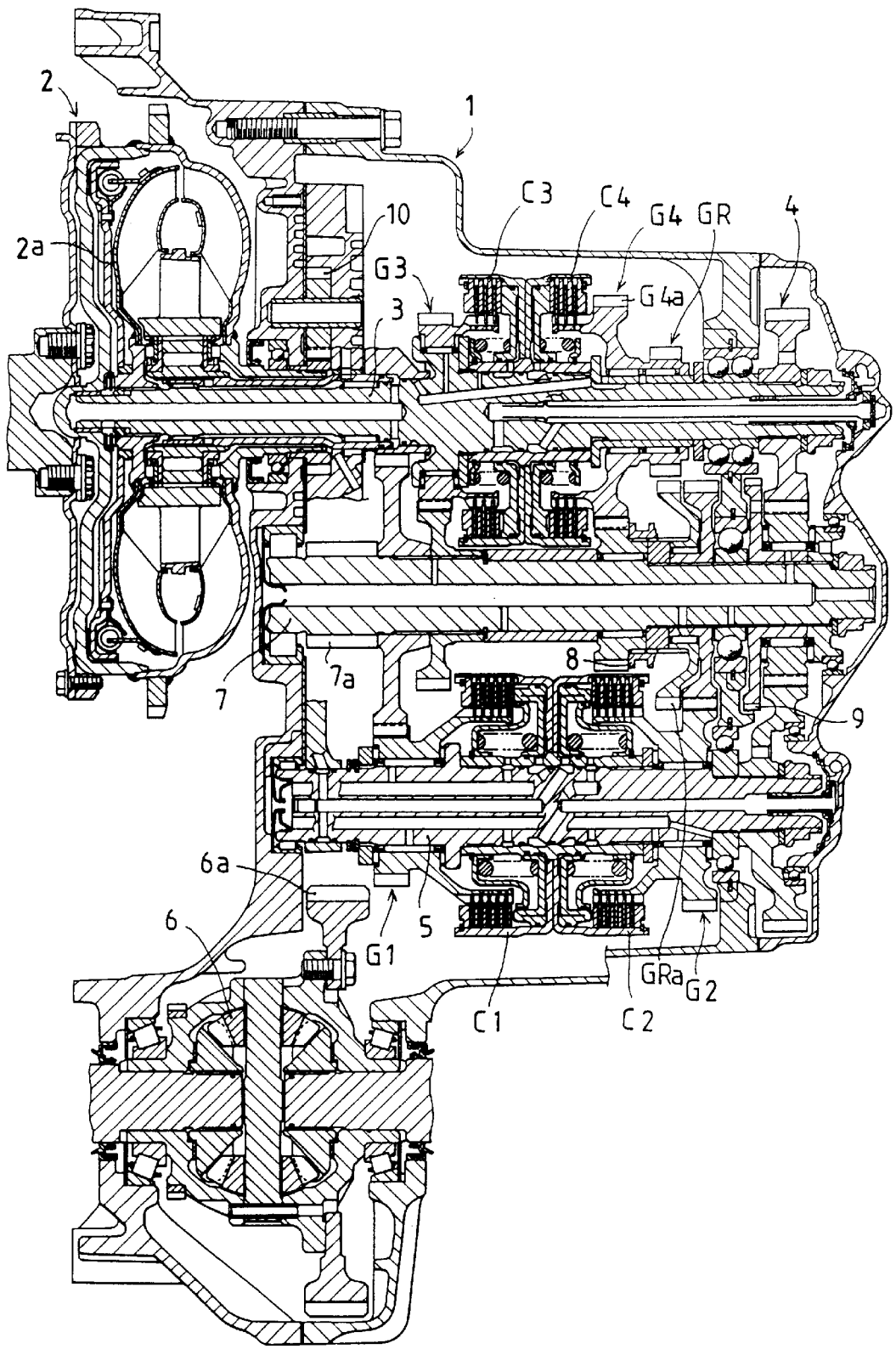
FIG. 1 is a cross-sectional view of a transmission to which the apparatus of the present invention is applied.

With reference to FIG. 1, numeral 1 denotes a hydraulically operated vehicular transmission for carrying out speed changing of four forward transmission trains and one reverse transmission train. The transmission 1 is provided with an input shaft 3 which is connected to an engine via a fluid torque converter 2; an intermediate shaft 5 which is always connected to the input shaft 3 via a gear train 4; and an output shaft 7 having a shaft end output gear 7a which is engaged with a final gear 6a on a differential 6 which is connected to driving wheels of a vehicle such as a motor vehicle. In the figure, the final gear 6a and the output gear 7a are illustrated in a manner separated from each other. This is because the figure is drawn in a development view, and both the gears 6a, 7a are actually in mesh with each other.

A first speed transmission train G1 and a second speed transmission train G2 are provided in parallel between the intermediate shaft 5 and the output shaft 7. A third speed transmission train G3, and a fourth speed transmission train G4 and a reverse transmission train GR are provided in parallel between the input shaft 3 and the output shaft 7. On the intermediate shaft 5 there are provided a first speed hydraulic clutch C1 and a second speed clutch C2, which are both defined as hydraulic engaging elements, interposed in the fist speed and the second speed transmission trains G1, G2, respectively. On the input shaft 5 there are provided a third speed hydraulic clutch C3 and a fourth speed hydraulic clutch C4, both of which are defined as hydraulic engaging elements, interposed in the third speed and the fourth speed transmission trains G3, G4, respectively. It is thus so arranged that, when each of the hydraulic clutches C1, C2, C3, C4 is engaged, the corresponding transmission train G1, G2, G3, G4 can be selectively established. The reverse transmission train GR is constituted or arranged to commonly use the fourth speed hydraulic clutch C4 with the fourth transmission train G4. By a switching (or changeover) operation of a selector gear 8 on the input shaft 7 between a forward running (or a forward drive) side on the left side as seen in FIG. 1 and a reverse running (or a reverse drive) side on the right side therein, the selector gear 8 is engaged with a driven gear G4a, GRa of the fourth speed transmission train G4 and the reverse transmission train GR, respectively. The fourth speed transmission train G4 and the reverse transmission train GR are thus selectively established. In the reverse transmission train GR, an idle gear (not illustrated) is interposed. Reference numeral 9 in the figure denotes a parking gear provided on the output shaft 7.

Figure 2:
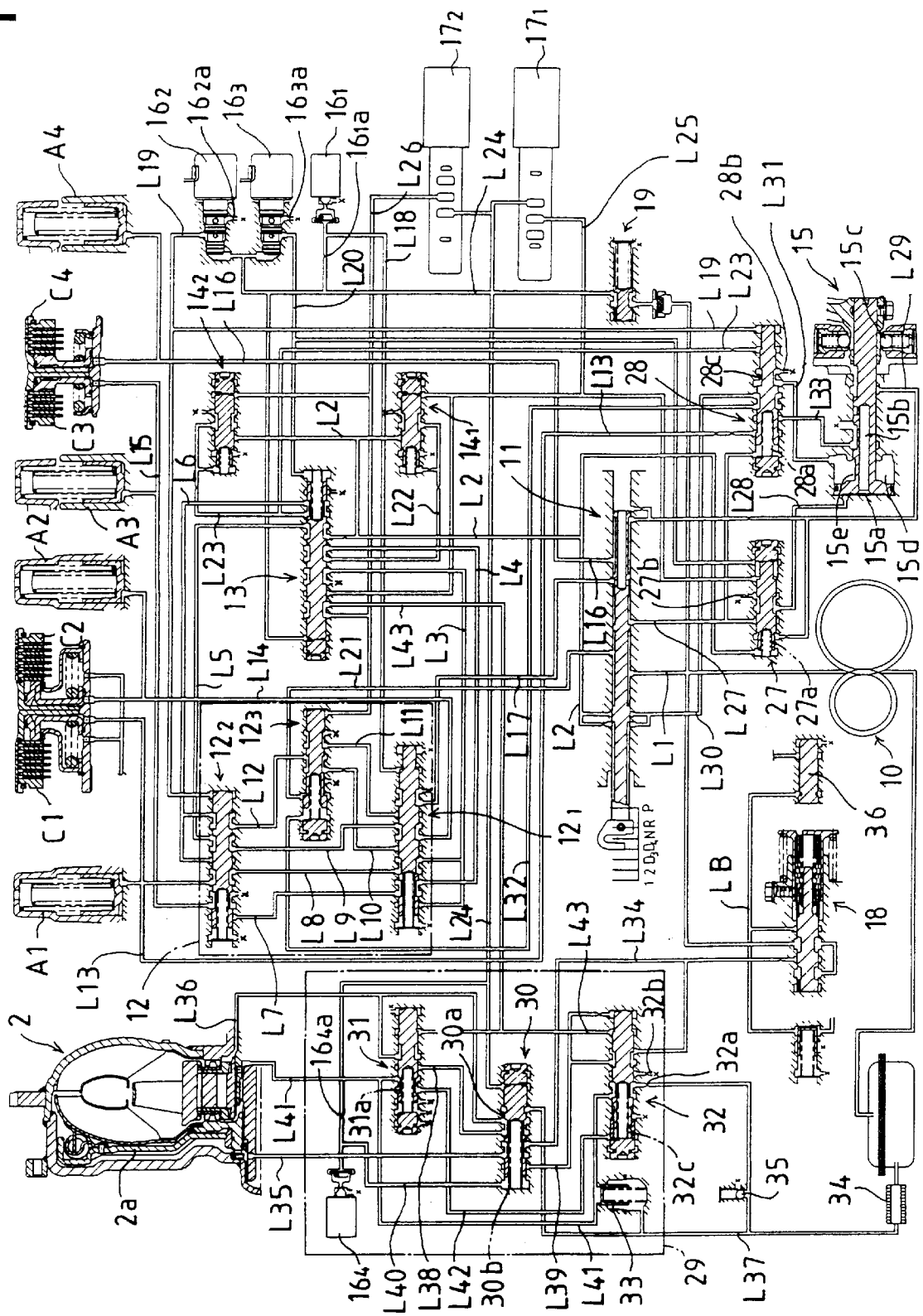
FIG. 2 is a diagram showing a hydraulic oil circuit of the transmission in FIG. 1.

Supply and discharge of hydraulic oil to and from each of the above-described hydraulic clutches C1–C4 are controlled by a hydraulic circuit as shown in FIG. 2. The hydraulic circuit is provided with: a hydraulic pressure source 10 which is made up of a gear pump driven by the engine via a casing of the fluid torque converter 2; a manual valve 11 which is operated for switching in interlocking with a selector lever inside a vehicle compartment; a shift valve unit 12; a changeover valve 13 on an upstream side of the shift valve unit 12; a pair of first and second pressure regulating valves $14_1$, $14_2$ which are connected to the changeover valve 13; a servo valve 15 which switches between the forward running and the reverse running and to which is connected a fork 8a to be engaged with the selector gear 8; three sets of first through third solenoid valves $16_1$, $16_2$, $16_3$ for controlling to switch the shift valve unit 12 and the changeover valve 13; and a pair of first and second solenoid proportional valves $17_1$, $17_2$ for controlling to regulate the hydraulic pressure in the first and the second pressure regulating valves $14_1$, $14_2$. Reference numerals A1 through A4 denote accumulators provided to absorb sudden pressure changes in each of the hydraulic clutches C1 through C4, respectively.

The manual valve 11 is switchable to a total of seven positions (or ranges), i.e., a parking position "P", a reverse position "R", a neutral position "N", an automatic speed changing position "$D_4$" for the first through the fourth speeds, an automatic speed changing position "$D_3$" for the first through the third speeds, a second speed retaining position "2", and a first speed retaining position "1".

Figure 3:
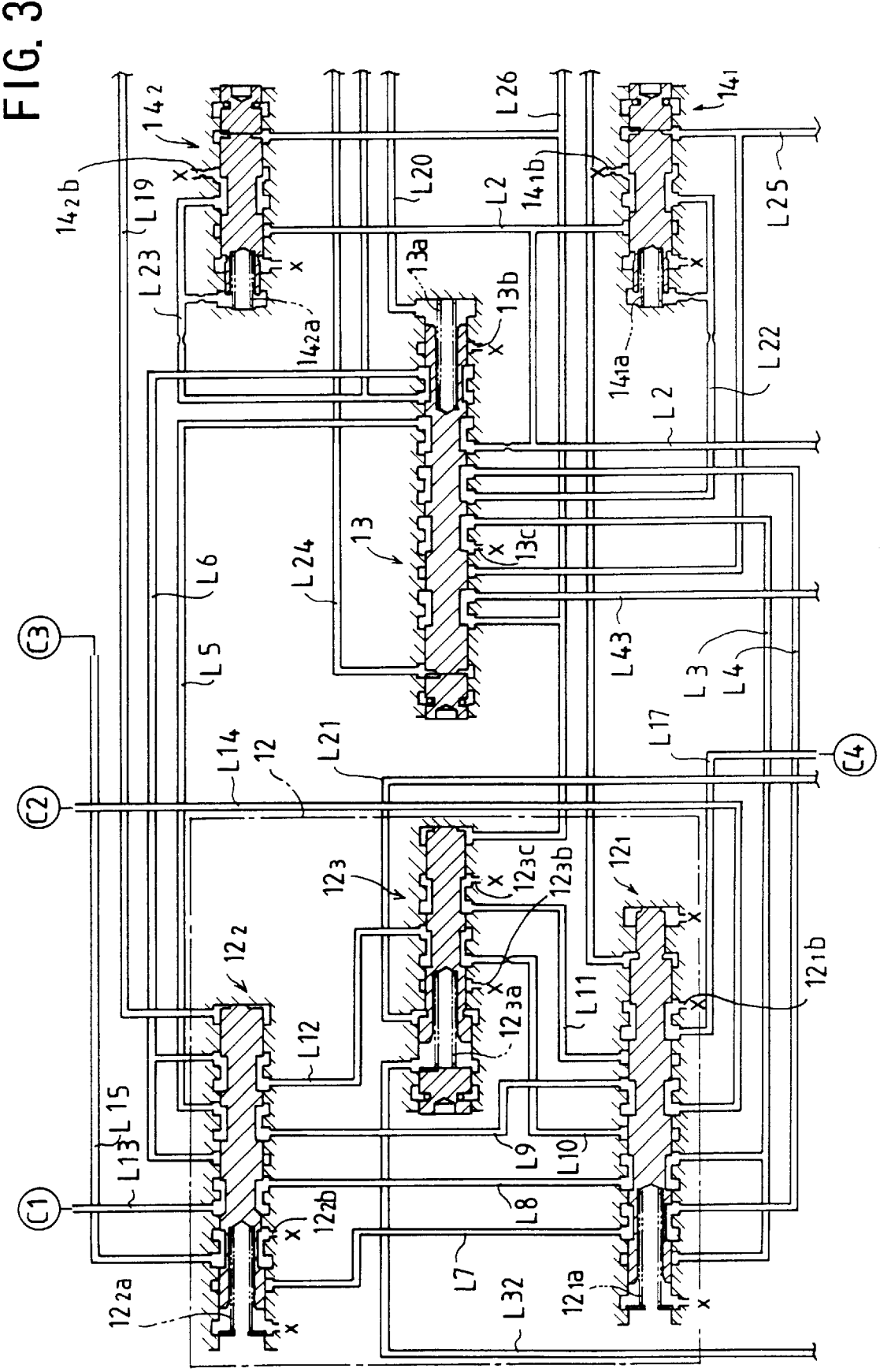
FIG. 3 is an enlarged diagram of an important portion of the hydraulic oil circuit.

In the "$D_4$" position of the manual valve 11, No. 1 oil passage L1 which is in communication with the hydraulic pressure source 10 is connected to No. 2 oil passage L2 which is in communication with the changeover valve 13. Pressurized hydraulic oil that has been regulated by a regulator 18 to a certain line pressure is supplied from No. 1 oil passage L1 to No. 2 oil passage L2. This pressurized oil is selectively supplied to the first speed through the fourth speed hydraulic clutches C1 through C4 via the changeover valve 13 and the shift valve unit 12 to thereby carry out the speed changing of the first speed through the fourth speed. Detailed explanations will be made hereinafter about the shift valve unit 12, the changeover valve 13, and the pressure regulating valves $14_1$, $14_2$ with reference to FIG. 3.

The shift valve unit 12 is constituted by three sets of first through third shift valves $12_1$, $12_2$, $12_3$. The first shift valve $12_1$ is connected to the changeover valve 13 via two, i.e., No. 3 and No. 4, oil passages L3, L4. The second shift valve $12_2$ is connected to the changeover valve 13 via two, i.e., No. 5 and No. 6, oil passages L5, L6. The first and the second shift valves $12_1$, $12_2$ are connected to each other via three, i.e., No. 7 through No. 9, oil passages L7, L8, L9. Further, the third shift valve $12_3$ is connected to the first shift valve $12_1$ via two, i.e., No. 10 and No. 11, oil passages L10, L11 and is also connected to the second shift valve $12_2$ via No. 12 oil passage L12.

The first speed hydraulic clutch C1 is connected to the second shift valve $12_2$ via No. 13 oil passage L13. The second speed hydraulic clutch C2 is connected to the first shift valve $12_1$ via No. 14 oil passage L14. The third speed hydraulic clutch C3 is connected to the second shift valve $12_2$ via No. 15 oil passage L15. The fourth speed hydraulic clutch C4 is connected to the first shift valve $12_1$ via No. 17 oil passage L17 which is connected, in the "$D_4$", "$D_3$", "2" and "1" positions of the manual valve 11, to No. 16 oil passage L16 that is connected to the fourth speed hydraulic clutch C4.

The first shift valve $12_1$ is urged to the right position by a spring $12_1a$ and is also urged to the left position by the hydraulic pressure in No. 18 oil passage L18 which is controlled by the first solenoid valve $16_1$. The second shift valve $12_2$ is urged to the right position by a spring $12_2a$ and is also urged to the left position by the hydraulic pressure in No. 19 oil passage L19 which is controlled by the second solenoid valve $16_2$. The third shift valve $12_3$ is urged to the right by a spring $12_3a$ and is also urged to the left by the hydraulic pressure in No. 21 oil passage L21 which is connected to No. 1 oil passage L1 in a position of the manual valve 11 other than the "2" and "1" positions. In the "$D_4$" position of the manual valve 11, the third shift valve $12_3$ is held or retained in the left position by the line pressure to be inputted via No. 21 oil passage L21 so that No. 10 oil passage L10 is connected to an oil discharge port $12_3b$ of the third shift valve $12_3$, and No. 11 oil passage L11 and No. 12 oil passage L12 are connected together.

At the time of the first speed running (or the first speed drive) in the "$D_4$" position of the manual valve 11, the first shift valve $12_1$ is switched to the left position and the second shift valve $12_2$ is switched to the right position. According to these operations, No. 13 oil passage L13 for the first speed hydraulic clutch C1 is connected to No. 4 oil passage L4 which is defined as a second connecting oil passage to the changeover valve 13. At this time, No. 14 oil passage L14 for the second speed hydraulic clutch C2 is connected to that oil discharge port $12_3b$ of the third shift valve $12_3$ which is defined as an oil discharge passage, via the first shift valve $12_1$ and No. 10 oil passage L10. No. 15 oil passage L15 for the third speed hydraulic clutch C3 is connected to that oil discharge port $12_2b$ of the second shift valve $12_2$ which is defined as an oil discharge passage. No. 16 oil passage L16 for the fourth speed hydraulic clutch C4 is connected to No. 6 oil passage L6, which is defined as a fourth connecting oil passage to the changeover valve 13, via No. 17 oil passage L17, the first shift valve $12_1$, No. 11 oil passage L11, the third shift valve $12_3$, No. 12 oil passage L12, and the second shift valve $12_2$.

At the time of the second speed running, the first shift valve $12_1$ is switched to the right position while holding the second shift valve $12_2$ in the right position. According to these operations, No. 14 oil passage L14 for the second speed hydraulic clutch C2 is connected to No. 5 oil passage L5, which is defined as a third connecting oil passage to the changeover valve 13, via the first shift valve $12_1$, No. 9 oil passage L9, and the second shift valve $12_2$. No. 13 oil passage L13 for the first speed hydraulic clutch C1 is connected to No. 3 oil passage L3, which is defined as a first connecting oil passage to the changeover valve 13, via the second shift valve $12_2$, No. 8 oil passage L8, and the first shift valve $12_1$. At this time, No. 15 oil passage L15 for the third speed hydraulic clutch C3 is connected to the oil discharge port $12_2b$ of the second shift valve $12_2$ like at the time of the first speed running. No. 16 oil passage L16 for the fourth speed hydraulic clutch C4 is connected to that oil discharge port $12_1b$ of the first shift valve $12_1$ which is defined as a discharge oil passage, via No. 17 oil passage L17.

At the time of the third speed running, the second shift valve $12_2$ is switched to the left position while holding the first shift valve $12_1$ in the right position. According to these operations, No. 15 oil passage L15 for the third speed hydraulic clutch C3 is connected to No. 4 oil passage L4 via the second shift valve $12_2$, No. 7 oil passage L7 and the first shift valve $12_1$. No. 14 oil passage L14 for the second speed hydraulic clutch C2 is connected to No. 6 oil passage L6 via the first shift valve $12_1$, No. 9 oil passage L9 and the second shift valve $12_2$. At this time, No. 13 oil passage L13 for the first speed hydraulic clutch C1 is connected to the oil discharge port $12_2b$ of the second shift valve $12_2$. No. 16 oil passage L16 for the fourth hydraulic clutch C4 is connected to the oil discharge port $12_1b$ of the first shift valve $12_1$ via No. 17 oil passage L17, like at the time of the second speed running.

At the time of the fourth speed running, the first shift valve $12_1$ is switched to the left position while holding the second shift valve $12_2$ in the left position. According to these operations, No. 16 oil passage L16 for the fourth speed hydraulic clutch C4 is connected to No. 5 oil passage L5 via No. 17 oil passage L17, the first shift valve $12_1$, No. 11 oil passage L11, the third shift valve $12_3$, No. 12 oil passage L12 and the second shift valve $12_2$. No. 15 oil passage L15 for the third speed hydraulic clutch C3 is connected to No. 3 oil passage L3 via the second shift valve $12_2$, No. 7 oil passage L7 and the first shift valve $12_1$. At this time, No. 13 oil passage L13 for the first speed hydraulic clutch C1 is connected to the oil discharge port $12_2b$ of the second shift valve $12_2$, like at the time of the third speed running. No. 14 oil passage L14 for the second speed hydraulic clutch C2 is connected to the oil discharge port $12_3b$ of the third shift valve $12_3$ via the first shift valve $12_1$ and No. 10 oil passage L10, like at the time of the first speed running.

To the changeover valve 13 there are connected: No. 2 oil passage L2 which is defined as an oil passage at a line pressure; No. 3 through No. 6 oil passages L3, L4, L5, L6 as the first through the fourth connecting oil passages; No. 22 oil passage L22 which is defined as a first pressure-regulated oil passage whose pressure is regulated by the first pressure regulating valve $14_1$; and No. 23 oil passage L23 which is defined as a second pressure-regulated oil passage whose pressure is regulated by the second pressure regulating valve $14_2$. The changeover valve 13 is urged to the right position, which is defined as a first switchover position, by a predetermined pressure lower than the line pressure (hereinafter called a modulator pressure) which is outputted to No. 24 oil passage L24 on the downstream side of a modulator valve 19 which is connected to No. 1 oil passage L1. The changeover valve 13 is urged to the left position, which is defined as a second switchover position, by a spring 13a and the hydraulic pressure in No. 20 oil passage L20 to be controlled by the third solenoid valve $16_3$.

When the changeover valve 13 is in the right position, No. 3 oil passage L3 is connected to No. 22 oil passage L22, and No. 5 oil passage L5 is connected to No. 23 oil passage L23. Therefore, it becomes possible to regulate the hydraulic pressure in each of No. 3 and No. 5 oil passages L3, L5 by the first and the second pressure regulating valves $14_1$, $14_2$, respectively. At this time, No. 4 oil passage L4 is connected to No. 2 oil passage L2, and No. 6 oil passage L6 is connected to that oil discharge port 13b of the changeover valve 13 which is defined as an oil discharge passage.

When the changeover valve 13 is in the left position, No. 4 oil passage L4 is connected to No. 22 oil passage L22, and No. 6 oil passage L6 is connected to No. 23 oil passage L23. Therefore, it becomes possible to regulate the hydraulic pressure in each of No. 4 and No. 6 oil passages L4, L6 by the first and the second pressure regulating valves $14_1$, $14_2$, respectively. At this time, No. 3 oil passage L3 is connected to that oil discharge port 13c of the changeover valve 13 which is defined as the oil discharge passage, and No. 5 oil passage L5 is connected to No. 2 oil passage L2.

At the time of the first speed in which the first shift valve $12_1$ is in the left position, the second shift valve $12_2$ is in the right position, and the first speed hydraulic clutch C1 is connected to No. 4 oil passage L4, the changeover valve 13 is switched and held in the right position, and No. 4 oil passage L4 is connected to No. 2 oil passage L2. In this way, the hydraulic pressure in the first speed hydraulic clutch C1 (hereinafter called a first speed pressure) becomes the line pressure, whereby the first speed transmission train G1 is established through the engagement of the first speed hydraulic clutch C1.

At the time of the second speed in which both the first and the second shift valves $12_1$, $12_2$ are in the right position, and the first speed hydraulic clutch C1 is connected to No. 3 oil passage L3, and the second speed hydraulic clutch C2 is connected to No. 5 oil passage L5, respectively, the changeover valve 13 is switched and held in the left position, No. 3 oil passage L3 is connected to the oil discharge port 13c, and No. 5 oil passage L5 is connected to No. 2 oil passage L2. In this manner, the first speed pressure is lowered to the atmospheric pressure to thereby release the engagement of the first speed hydraulic clutch C1. On the other hand, the hydraulic pressure in the second speed hydraulic clutch C2 (hereinafter called a second speed pressure) becomes the line pressure, whereby the second speed transmission train G2 is established through the engagement of the second speed hydraulic clutch C2.

At the time of upshifting from the first speed to the second speed, both the first and the second shift valves $12_1$, $12_2$ are first switched to the condition of the second speed while holding the changeover valve 13 in the position at the time of the first speed, i.e., in the right position. In this case, No. 3 and No. 5 oil passages L3, L5 to be connected to the first and the second speed hydraulic clutches C1, C2, respectively, are connected to No. 22 and No. 23 oil passages L22, L23, respectively. Therefore, it becomes possible to control the pressure drop characteristics of the first speed pressure by the first pressure regulating valve $14_1$ and to control the pressure rise characteristics of the second speed pressure by the second pressure regulating valve $14_2$, whereby a smooth upshifting from the first speed to the second speed can be carried out. After the speed changing has been completed, the changeover valve 13 is switched to the left position. Hydraulic oil is discharged from the first speed hydraulic clutch C1 without passing through the first pressure regulating valve $14_1$, and the second speed hydraulic clutch C2 is supplied with pressurized oil at the line pressure without passing through the second pressure regulating valve $14_2$.

At the time of downshifting from the second speed to the first speed, the changeover valve 13 is first switched from the position at the time of the second speed to the position at the time of the first speed, i.e., from the left position to the right position, while holding both the shift valves $12_1$, $12_2$ to the condition at the time of the second speed. According to these operations, like at the time of upshifting from the first speed to the second speed, both the first speed and the second speed hydraulic clutches C1, C2 are connected to No. 22 and No. 23 oil passages L22, L23, respectively. Therefore, it becomes possible to control the pressure rise characteristics of the first speed pressure by the first pressure regulating valve $14_1$, and to control the pressure drop characteristics of the second speed pressure by the second pressure regulating valve $14_2$, whereby a smooth downshifting from the second speed to the first speed can be carried out. After the speed changing has been completed, both the first and the second shift valves $12_1$, $12_2$ are switched to the condition of the first speed running. The second speed hydraulic clutch C2 is connected to the oil discharge port $12_3 b$ of the third shift valve $12_3$. The hydraulic oil is thus discharged from the second speed hydraulic clutch C2 without passing through the second pressure regulating valve $14_2$. And the first speed hydraulic clutch C1 is supplied with the pressurized oil at the line pressure without passing through the first pressure regulating valve $14_1$ like at the time of the first speed.

At the time of the third speed in which the first shift valve $12_1$ is in the right position, the second shift valve $12_2$ is in the left position, the second speed hydraulic clutch C2 is connected to No. 6 oil passage L6, and the third speed hydraulic clutch C3 is connected to No. 4 oil passage L4, respectively, the changeover valve 13 is switched and held in the right position. Like at the time of the first speed running, No. 6 oil passage L6 is connected to the oil discharge port 13b and No. 4 oil passage L4 is connected to No. 2 oil passage L2. In this manner, the second speed pressure is lowered to the atmospheric pressure and the engagement of the second speed hydraulic clutch C2 is thereby released. On the other hand, the hydraulic pressure in the third speed hydraulic clutch C3 (hereinafter called a third speed pressure) becomes the line pressure, whereby the third speed transmission train G3 is established through the engagement of the third speed hydraulic clutch C3.

At the time of upshifting from the second speed to the third speed, both the first and the second shift valves $12_1$, $12_2$ are switched to the condition of the third speed while holding the changeover valve 13 in the position of the second speed running, i.e., in the left position. In this case, No. 4 and No. 6 oil passages L4, L6 to be connected to the third and the second speed hydraulic clutches C3, C2 are connected to No. 22 and No. 23 oil passages L22, L23, respectively. Therefore, it becomes possible to control the pressure rise characteristics of the third speed pressure by the first pressure regulating valve $14_1$ and to control the pressure drop characteristics of the second speed pressure by the second pressure regulating valve $14_2$. Therefore, a smooth upshifting from the second speed to the third speed can be carried out. After the speed changing has been completed, the changeover valve 13 is switched to the right position. The hydraulic oil is discharged from the second speed hydraulic clutch C2 without passing through the second pressure regulating valve $14_2$, and the third speed hydraulic clutch C3 is supplied with the pressurized oil at the line pressure without passing through the first pressure regulating valve $14_1$.

At the time of downshifting from the third speed to the second speed, the changeover valve 13 is first switched from the position at the time of the third speed to the position at the time of second speed, i.e., from the right position to the left position, while holding both the first and the second shift valves $12_1$, $12_2$ to the condition of the third speed. According to these operations, like at the time of upshifting from the second speed to the third speed, both the third speed and the second speed hydraulic clutches C3, C2 are connected to No. 22 and No. 23 oil passages L22, L23, respectively. Therefore, it becomes possible to control the pressure drop characteristics of the third speed pressure by the first pressure regulating valve $14_1$, and to control the pressure rise characteristics of the second speed pressure by the second pressure regulating valve $14_2$, whereby a smooth downshifting from the third speed to the second speed can be carried out. After the speed changing has been completed, both the fist and the second shift valves $12_1$, $12_2$ are switched to the condition of the second speed and the third speed hydraulic clutch C3 is connected to the oil discharge port $12_2 b$ of the second shift valve $12_2$. The hydraulic oil is thus discharged from the third speed hydraulic clutch C3 without passing through the first pressure regulating valve $14_1$ and the second speed hydraulic clutch C2 is supplied with the pressurized oil at the line pressure without passing through the second pressure regulating valve $14_2$ like at the time of the second speed.

At the time of the fourth speed in which both the first and the second shift valves $12_1$, $12_2$ are in the left position, and the third speed hydraulic clutch C3 is connected to No. 3 oil passage L3, and the fourth speed hydraulic clutch C4 is connected to No. 5 oil passage L5, respectively, the changeover valve 13 is switched and held at the left position. Like at the time of second speed, No. 3 oil passage L3 is connected to the oil discharge port 13c, and No. 5 oil passage L5 is connected to No. 2 oil passage L2. In this manner, the third speed pressure is lowered to the atmospheric pressure to thereby release the engagement of the third speed hydraulic clutch C3. On the other hand, the hydraulic pressure in the fourth speed hydraulic clutch C4 (hereinafter called a fourth speed pressure) becomes the line pressure, whereby the fourth speed transmission train G4 is established through the engagement of the fourth speed hydraulic clutch C4.

At the time of upshifting from the third speed to the fourth speed, both the first and the second shift valves $12_1$, $12_2$ are switched to the condition of the fourth speed while holding the changeover valve 13 in the position of the third speed, i.e., in the right position. In this case, No. 3 and No. 5 oil passages L3, L5 to be connected to the third and the fourth hydraulic clutches C3, C4 are connected to No. 22 and No. 23 oil passages L22, L23, respectively. Therefore, it becomes possible to control the pressure drop characteristics of the third speed pressure by the first pressure regulating valve $14_1$ and to control the pressure rise characteristics of the fourth speed pressure by the second regulating valve $14_2$. A smooth upshifting from the third speed to the fourth speed can thus be carried out. After the speed changing has been completed, the changeover valve 13 is switched to the left position. The hydraulic oil is discharged from the third speed hydraulic clutch C3 without passing through the first pressure regulating valve $14_1$. And the fourth speed hydraulic clutch C4 is supplied with the oil at the line pressure without passing through the second pressure regulating valve $14_2$.

At the time of downshifting from the fourth speed to the third speed, the changeover valve 13 is first switched from the position at the time of the fourth speed to the position at the time of the third speed, i.e., from the left position to the right position, while holding both the first and the second shift valves $12_1$, $12_2$ to the condition of the fourth speed. According to these operations, like at the time of upshifting from the third speed to the fourth speed, the third speed and the fourth speed hydraulic clutches C3, C4 are connected to No. 22 and No. 23 oil passages L22, L23, respectively. Therefore, it becomes possible to control the pressure rise characteristics of the third speed pressure by the first pressure regulating valve $14_1$, and to control the pressure drop characteristics of the fourth speed pressure by the second pressure regulating valve $14_2$, whereby a smooth downshifting from the fourth speed to the third speed can be carried out. After the speed changing has been completed, both the fist and the second shift valves $12_1$, $12_2$ are switched to the condition of the third speed. The fourth speed hydraulic clutch C4 is connected to the oil discharge port $12_1b$ of the first shift valve $12_1$. The hydraulic oil is thus discharged from the fourth speed hydraulic clutch C4 without passing through the second pressure regulating valve $14_2$. And the third speed hydraulic clutch C3 is supplied with the pressurized oil at the line pressure without passing through the first pressure regulating valve $14_1$.

Each of the first and the second pressure regulating valves $14_1$, $14_2$ is urged by each of springs $14_1a$, $14_2a$ and by the hydraulic pressure in each of No. 22 and No. 23 oil passages L22, L23 to the rightward oil discharge side in which each of No. 22 and No. 23 oil passages L22, L23 is connected to each of the oil discharge ports $14_1b$, $14_2b$, respectively. Further, the first and the second pressure regulating valves $14_1$, $14_2$ are urged by the respective hydraulic pressures in No. 25 and No. 26 oil passages L25, L26 on the output side of each of solenoid proportional valves $17_1$, $17_2$ to the leftward oil supply side in which No. 22 and No. 23 oil passages L22, L23 are respectively connected to No. 2 oil passages L2. In this manner, the hydraulic pressure in each of No. 22 and No. 23 oil passages L22, L23 is increased or decreased in proportion to the output pressure of each of the solenoid proportional valves $17_1$, $17_2$. In order to decrease the speed change shocks, it becomes necessary to perform a delicate control of the hydraulic pressure in a transient region of engagement of the hydraulic clutch on the disengaging side and the hydraulic clutch on the engaging side. In this embodiment, after the completion of the speed changing, the hydraulic oil supply to the hydraulic clutch on the engaging side and the hydraulic oil discharge from the hydraulic clutch on the disengaging side are made without passing through the pressure regulating valves $14_1$, $14_2$. Therefore, the pressure regulating valves $14_1$, $14_2$ need to bear the hydraulic pressure control only in the transient region of engagement at a relatively low hydraulic pressure. Therefore, the resolution of the pressure control can be made higher and the delicate control of the pressure rise characteristics of the hydraulic clutch on the engaging side and the pressure drop characteristics of the hydraulic clutch on the disengaging side can be performed at a higher accuracy.

Modulator pressure is inputted into both the first and the second solenoid proportional valves $17_1$, $17_2$ via No. 24 oil passage L24. Here, as the first solenoid proportional valve $17_1$, there is used one in which an output pressure becomes maximum (modulator pressure) at the time of non-energization. As the second solenoid proportional valve $17_2$, there is used one in which the output pressure becomes minimum (atmospheric pressure) at the time of non-energization.

The first solenoid valve $16_1$ is constituted by a two-way valve which opens to atmosphere No. 18 oil passage L18 which is connected to No. 24 oil passage L24 via a throttle $16_1a$. At the time of non-energization thereof, it is closed to thereby change the hydraulic pressure in No. 18 oil passage L18 to a high hydraulic pressure (modulator pressure).

Each of the second and the third solenoid valves $16_2$, $16_3$ is constituted by a three-way valve which is switchable between an oil supply position in which No. 19 and No. 20 oil passages L19, L20 on the output side of the respective solenoid valves are connected to No. 24 oil passage L24, and an oil discharge position in which this connection is shut off and connect each of the oil passages L19, L20 to each of oil discharge ports $16_2a$, $16_3a$, respectively. At the time of non-energization thereof, it is switched to the oil supply position and change the hydraulic pressure in each of No. 19 and No. 20 oil passages L19, L20 to a high hydraulic pressure (modulator pressure).

It may also be considered to constitute the second and the third solenoid valves $16_2$, $16_3$ by a two-way valve like the first solenoid valve $16_1$. However, the two-way valve has disadvantages in that an oil leak amount when opened becomes large and that the control response becomes poor because, at a low temperature, there remains a residual hydraulic pressure even when it is opened. Here, at the time of low speed running at the first speed or at the time when the vehicle is stopped, the revolution speed of the engine lowers so that the amount of oil supply from the hydraulic pressure source 10 decreases and, therefore, the oil leak amount must be minimized. In addition, at the first speed, since the second shift valve 12₂ and the changeover valve 13 are moved to the right position, No. 19 and No. 20 oil passages L19, L20 must be made to the atmospheric pressure. If the second and the third solenoid valves 16₂, 16₃ are constituted by two-way valves, the leak amount becomes excessive. In view of the above disadvantages and in view of the fact that the switching operation of the changeover valve 13 that must be switched with a good response is carried out by the third solenoid valve 16₃, the following arrangement has been employed in this embodiment. Namely, the second and the third solenoid vales 16₂, 16₃ are respectively constituted by a three-way valve and, in view of the space, only the first solenoid valve 16₁ is constituted by a small-sized two-way valve.

In the "D₄" position of the manual valve 11, the state of energization or non-energization of the first through the third solenoid valves 16₁, 16₂, 16₃; the position of the first and the second shift valves 12₁, 12₂; and the output pressures (pressures in No. 22 and No. 23 oil passages L22, L23) of the first and the second pressure regulating valves 14₁, 14₂; at the in-gear time (initial gear engagement), as well as at the first through the fourth speeds are as shown in the table given hereinbelow.

| | 1st speed | 1st ⇔ 2nd speed | 2nd speed | 2nd ⇔ 3rd speed | 3rd speed | 3rd ⇔ 4th speed | 4th speed |
|---|---|---|---|---|---|---|---|
| 1st sol. valve (16₁) | X | O | O | O | O | X | X |
| 2nd sol. valve (16₂) | O | O | O | X | X | X | X |
| 3rd sol. valve (16₃) | O | O | X | X | O | O | X |
| 1st shift valve (12₁) | Left | Right | Right | Right | Right | Left | Left |
| 2nd shift valve (12₂) | Right | Right | Right | Left | Left | Left | Left |
| changeover valve (13) | Right | Right | Left | Left | Right | Right | Left |
| 1st p. reg. valve (14₁) | H | H ⇔ L | L | L ⇔ H | H | H ⇔ L | L |
| 2nd p. reg. valve (14₂) | L | L ⇔ H | H | H ⇔ L | L | L ⇔ H | H | sol. valve = solenoid valve; p. reg. valve = pressure regulating valve; L = Low; H = High; O = energized; X = not energized In this embodiment, between the first and the second pressure regulating valves 14₁, 14₂, the one that functioned as an oil supply pressure regulating valve for boosting the hydraulic pressure in the hydraulic clutch on the engaging side at the time of the last speed changing will function as an oil discharge pressure regulating valve (i.e., a pressure regulating valve for oil discharge) for dropping or lowering the hydraulic pressure in the hydraulic clutch on the disengaging side at the time of the next speed changing. Further, the one that functioned as an oil discharge pressure regulating valve at the time of the last speed changing will function as an oil supply pressure regulating valve (i.e., a pressure regulating valve for oil supply) at the time of the next speed changing. Therefore, the output pressure of each of the pressure regulating valves 14₁, 14₂ can be maintained as it is to thereby make it ready for the next speed changing. On the contrary, if one of the first and the second pressure regulating valves 14₁, 14₂ is used exclusively for oil supply and the other thereof is used exclusively for oil discharge, the following becomes necessary. Namely, the output pressure of the oil supply pressure regulating valve that was boosted at the time of speed changing must be lowered, and also the output pressure of the oil discharge pressure regulating valve that was lowered at the time of speed changing must be boosted to be prepared for the next speed changing. In this case, if the next speed changing is made at a low temperature within a short period of time, the speed changing will start when the pressure dropping of the output pressure in the oil supply pressure regulating valve or the boosting of the output pressure in the oil discharge pressure regulating valve has not been made sufficiently. As a consequence, the hydraulic pressure control at the time of speed changing gets out of order and the speed change shocks are likely to occur. Therefore, it is preferable to use, as in this embodiment, the first and the second pressure regulating valves 14₁, 14₂ alternately for oil supplying and for oil discharging at each speed changing.

Figure 4:
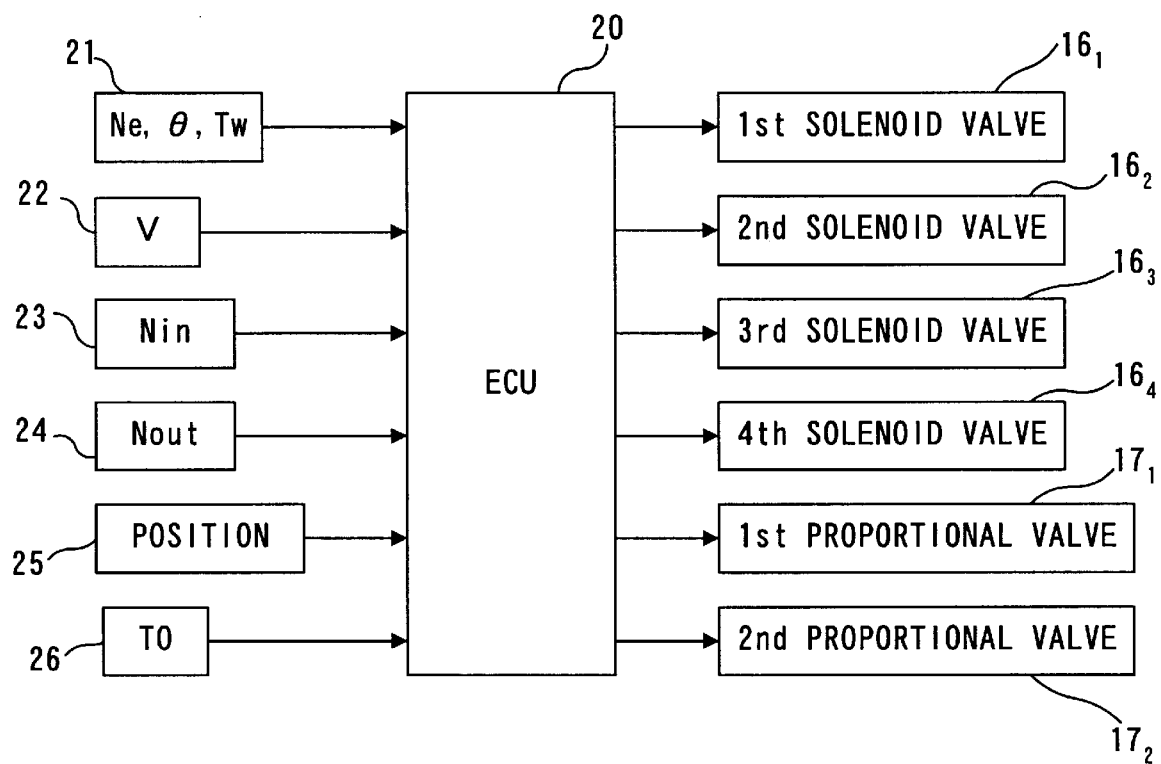
FIG. 4 is a block circuit diagram of a control system for solenoid valves provided in the hydraulic oil circuit.

The first through the third solenoid valves 16₁, 16₂, 16₃ as well as the first and the second solenoid proportional valves 17₁, 17₂ are controlled, together with a fourth solenoid valve 164 for a lockup clutch which is described later, by an electronic control unit 20 which is made up of a microcomputer as shown in FIG. 4.

In the electronic control unit (ECU) 20, there are inputted: a signal from a throttle sensor 21 for detecting a throttle opening θ of the engine; a signal from a vehicle speed sensor 22 for detecting the vehicle speed V; a signal from a speed sensor 23 for detecting the rotational speed Nin of the input shaft 3 of the transmission; a signal from a speed sensor 24 for detecting the rotational speed Nout of the output shaft 7 of the transmission; a signal from a position sensor 25 for the selector lever; and a signal from an oil temperature sensor 26 for detecting the oil temperature TO of the transmission.

In the "D₄" position, a transmission train that suits the present throttle opening θ and the vehicle speed V is selected based on a speed change map for the first through the fourth speeds kept in memory in the ECU 20, thereby carrying out an automatic speed changing of the first through the fourth speeds.

Also in the "D₃" position, the same oil circuit arrangement applies as that in the "D₄" position. Automatic speed changing of the first through the third speeds is performed based on the speed change map for the first through the third speeds that is stored in the ECU 20.

In the "2" and "1" positions, a stepwise downshifting to the second speed or to the first speed is carried out based on the second speed map or the first speed map that is stored in the ECU 20. Thereafter, the speed is maintained in the second speed or the first speed. In the "2" and "1" positions, No. 21 oil passage L21 that was connected to No. 1 oil passage L1 is opened to atmosphere. The third shift valve 12₃ can thus become switchable to the right position.

When the third shift valve 12₃ is switched to the right position, No. 10 oil passage L10 that was connected, in the left position, to the oil discharge port 12₃b is connected to No. 12 oil passage L12. And No. 11 oil passage L11 that was connected, in the left position, to No. 12 oil passage L12 is connected to the oil discharge port 12₃c of the third shift valve 12₃. No. 10 oil passage L10 and No. 11 oil passage L11 are connected, in the right position of the first shift valve 12₁, to none of the oil passages for the hydraulic clutches. When the first shift valve 12₁ is moved to the right position, the oil circuit arrangement will become the same as that when the first shift valve 12₁ is moved to the right position in the "D₄" position. Therefore, when both the first and the second shift valves 12₁, 12₂ are switched to the right position (a condition of the second speed in the "D₄"

position), the hydraulic oil is supplied to the second speed hydraulic clutch C2 to thereby establish the second speed transmission train G2. When the first shift valve $12_1$ is moved to the right position and the second shift valve $12_2$ is moved to the left position (a condition of the third speed in the "$D_3$" position), the hydraulic oil is supplied to the third speed hydraulic clutch C3 to thereby establish the third speed transmission train G3.

On the other hand, when the first shift valve $12_1$ is switched to the left position, No. 14 oil passage L14 for the second speed hydraulic clutch C2 is connected to No. 10 oil passage L10, and No. 17 oil passage L17 for the fourth speed hydraulic clutch C4 is connected to No. 11 oil passage L11, respectively, the oil circuit arrangement will therefore become different from that in the "$D_4$" position. When the first shift valve $12_1$ is moved to the left position and the second shift valve $12_2$ is moved to the right position (a condition of the first speed in the "$D_4$" position), No. 13 oil passage L13 for the first speed hydraulic clutch C1 is connected to No. 4 oil passage L4 (this connection is the same as that in the "$D_4$" position), and No. 14 oil passage L14 for the second speed hydraulic clutch C2 is connected to No. 6 oil passage L6 (in the "$D_4$" position No. 17 oil passage L17 for the fourth speed hydraulic clutch C4 is connected to No. 6 oil passage L6). When both the first and the second shift valves $12_1$, $12_2$ are moved to the left position (a condition of the fourth speed in the "$D_4$" position), No. 15 oil passage L15 for the third speed hydraulic clutch C3 is connected to No. 3 oil passage L3 (this connection is the same as that in the "$D_4$" position). No. 14 oil passage L14 for the second speed hydraulic clutch C2 is connected to No. 5 oil passage L5 (in the "$D_4$" position No. 17 oil passage L17 for the fourth speed hydraulic clutch C4 is connected to No. 5 oil passage L5). No oil supply is therefore made to the fourth speed hydraulic clutch C4.

Here, the third shift valve $12_3$ is arranged to be urged to the left by that output pressure of the second solenoid proportional valve $17_2$ which is inputted via No. 26 oil passage L26. However, when the electric power supply to the first through the third solenoid valves $16_1$, $16_2$, $16_3$ as well as to the first and the second solenoid proportional valves $17_1$, $17_2$ stops at the time of a system failure due to opening of a fuse or the like, both the first and the second shift valves $12_1$, $12_2$ and the changeover valve 13 are switched to the left position, and also the output pressure of the second solenoid proportional valve $17_2$ becomes the atmospheric pressure. The third shift valve $12_3$ is thus switched in the "2" and the "1" positions to the right position and switched, in the "$D_4$" and the "$D_3$" positions, to the left position by the line pressure from No. 21 oil passage L21. Therefore, in the "1" and the "2" positions, the second speed transmission train G2 is established and, in the "$D_4$" and the "$D_3$" positions, the fourth speed transmission train G4 is established, respectively. The vehicle is able to run at the second speed and the fourth speed even at the time of the system failure.

In the "R" position of the manual valve 11, No. 2 oil passage L2 is opened to the atmosphere. No. 27 oil passage L27 is connected to No. 1 oil passage L1 and the hydraulic oil is supplied to a first oil chamber 15a on the left end of the servo valve 15 via No. 28 oil passage L28 which is connected to No. 27 oil passage L27 via a first servo control valve 27. According to these operations, the servo valve 15 is urged to the rightward reverse running position to thereby switch the selector gear 8 to the reverse running side. Also No. 28 oil passage L28 is connected to No. 29 oil passage L29 via that shaft bore 15b of the servo valve 15 which is communicated with the first oil chamber 15a. The oil passage L29 is connected to No. 16 oil passage L16 which is communicated with the fourth speed hydraulic clutch C4 in the "R" position of the manual valve 11. In this manner, the reverse transmission train GR is established by the hydraulic oil supply to the fourth speed hydraulic clutch C4 and by the switching of the selector gear 8 to the reverse running side.

The first servo control valve 27 is urged, by the hydraulic pressure in No. 20 oil passage L20 on the output side of the third solenoid valve $16_3$ and the hydraulic pressure in No. 25 oil passage L25 on the output side of the first solenoid proportional valve $17_1$, to the leftward open side in which No. 27 oil passage L27 and No. 28 oil passage L28 are connected. It is urged by a spring 27a, the hydraulic pressure in No. 2 oil passage L2 and the hydraulic pressure in No. 29 oil passage L29, to the rightward closed side in which the connection between No. 27 oil passage L27 and No. 28 oil passage L28 is shut off and connect No. 28 oil passage L28 to an oil discharge port 27b. In the "$D_4$", "$D_3$", "2" or "1" position, by means of the line pressure to be inputted via No. 2 oil passage L2, the first servo control valve 27 is held in the right position even if the output pressures of the third solenoid valve $16_3$ and the first solenoid proportional valve $17_1$ may both be increased. The oil supply to No. 28 oil passage L28 is thus blocked, and the servo valve 15 is retained in the leftward forward running position by an engaging member 15c, whereby the establishment of the reverse transmission train GR is blocked.

Further, when the manual valve 11 is switched to the "R" position while the vehicle is running forwards at a speed above a predetermined speed, the output pressures of both the third solenoid valve $16_3$ and the first solenoid proportional valve $17_1$ are made to be atmospheric pressure. The first servo control valve 27 is thus held in the right position, whereby the hydraulic oil supply to No. 28 oil passage L28, i.e., the establishment of the reverse transmission train GR, is blocked.

When the manual valve 11 is switched to the "R" position below a predetermined vehicle speed, the output pressure of the first solenoid proportional valve $17_1$ is gradually increased to thereby urge the first servo control valve 27 to the leftward open side. As described above, the hydraulic oil is supplied to the fourth speed hydraulic clutch C4 via No. 28 oil passage L28, the servo valve 15 and No. 29 oil passage L29. The first servo control valve 27 is functioned as a pressure regulating valve to thereby control the boosting of the hydraulic pressure in the fourth speed hydraulic clutch C4. Thereafter, the modulator pressure is outputted from the third solenoid valve $16_3$ to thereby urge the first servo control valve 27 to the left endmost position, whereby the hydraulic pressure in the fourth speed hydraulic clutch C4 is maintained at the line pressure. Even if the third solenoid valve $16_3$ fails while it is kept switched on and consequently its output pressure remains in the atmospheric pressure, the hydraulic pressure required to engage the fourth speed hydraulic clutch C4 can be secured by the output pressure of the first solenoid proportional valve $17_1$.

When the manual valve 11 is switched from the "R" position to the "$D_4$", "$D_3$", "2", or "1" position, the line pressure is inputted from No. 30 oil passage L30 which is connected like No. 2 oil passage L2 to No. 1 oil passage L1 in each of the above positions, to a second oil chamber 15d which is present in an intermediate position of the servo valve 15 via the second servo control valve 28 and No. 31 oil passage L31. The servo valve 15 is thus moved to the left and is switched to the forward running position.

The second servo control valve 28 is urged, by the first speed pressure to be inputted via No. 13 oil passage L13, the output pressure of the second solenoid valve 16$_2$ to be inputted via No. 19 oil passage L19, and the output pressure of the second pressure regulating valve 14$_2$ to be inputted via No. 23 oil passage L23, to the left position in which No. 30 oil passage L30 and No. 31 oil passage L31 are connected. It is urged by a spring 28a and the hydraulic pressure in No. 27 oil passage L27 to the right position in which the connection between No. 30 and No. 31 oil passages L30, L31 is shut off and No. 31 oil passage L31 is connected to an oil discharge port 28b.

In this manner, in the "R" position, the second servo control valve 28 is surely switched to the right position by the line pressure from No. 27 oil passage L27. After switching the manual valve 11 to the "D$_4$", "D$_3$", "2" or "1" position, the second servo control valve 28 is maintained in the right position until the first speed pressure rises to a predetermined value. The inputting of the line pressure to the second oil chamber 15d is thus blocked and the servo valve 15 is retained by an engaging means 15c in the reverse running position. When the first speed pressure has become a predetermined value or above, the second servo control valve 28 is switched to the left position, and the line pressure is inputted to the second oil chamber 15d to thereby switch the servo valve 15 to the forward running position. Therefore, even if the manual valve 11 is switched from the "R" position to the "D$_4$", "D$_3$", "2" or "1" position in a condition in which an accelerator pedal is stepped, the rotation in the reverse direction of the output shaft 7 is being restrained, at the time of switching of the servo valve 15, by a torque transmission in the forward (or positive) direction of rotation via the first speed transmission train G1 due to a rise in the first speed pressure. Consequently, the selector gear 8 and a driven gear G4a of the fourth speed transmission train G4 can smoothly be engaged in a condition in which no large relative rotation occurs. Wear of the meshing (or engaging) portions of both the gears 8, G4a can thus be prevented.

In case of an occurrence of an abnormality in that the second servo control valve 28 is locked in the right position due to an inclusion of a foreign matter or the like, or else the servo valve 15 is locked in the reverse running position even after the servo control valve 28 has been switched to the left position, the selector gear 8 will remain in the reverse running position even if the manual valve 11 is switched from the "R" position to the "D$_4$", "D$_3$", "2" or "1" position. If the hydraulic oil is consequently supplied to the fourth speed hydraulic clutch C4, the reverse transmission train GR will thus be established. As a solution, in this embodiment, there are provided No. 32 oil passage L32 which is in communication with the left end oil chamber of the third shift valve 12$_3$, and No. 33 oil passage L33 which is connected, in the reverse running position of the servo valve 15, to the second oil chamber 15d of the servo valve 15 via a notched groove 15e. It is thus so arranged that No. 32 oil passage L32 can be connected to No. 30 oil passage L30 in the right position of the second servo valve 28 and to No. 33 oil passage L33 in the left position of the second servo valve 28, respectively. According to this arrangement, when the above-described abnormality should occur, the line pressure is inputted to the left end oil chamber of the third shift valve 12$_3$ via No. 32 oil passage L32. Therefore, the third shift valve 12$_3$ is switched and held in the right position regardless of the hydraulic pressures in No. 21 oil passage L21 and No. 26 oil passage L26 which both urge the third shift valve 12$_3$ leftwards, whereby the hydraulic oil supply to the fourth speed hydraulic clutch C4 is blocked.

Once switched to the left position, the second servo valve 28 is held in the left position by a self-locking force to be generated by a difference in the pressure-receiving area between right and left lands of an annular groove 28c which connects No. 30 oil passage L30 and No. 31 oil passage L31 together. In case, however, the oil level largely varies due to a sudden cornering whereby the hydraulic pressure from the hydraulic pressure source 10 instantly stops or disappears, the second servo control valve 28 may be switched to right position by the force of the spring 28a. In such a case, if the second servo control valve 28 is arranged to be urged leftwards only by the first speed pressure, the second servo control valve 28 will no longer be returned, at the second through the fourth speeds, to the left position even when the hydraulic pressure restores. As a solution, in this embodiment, the second servo control valve 28 is urged to the left position also by the output pressure of the second pressure regulating valve 14$_2$ that becomes high at the second and the fourth speeds, as well as by the output pressure of the second solenoid valve 16$_2$ that becomes high at the third and the fourth speeds. At the first through the third speeds, even if the second servo control valve 28 does not return to the left position and the third shift valve 12$_3$ is switched to the right position by the input of the line pressure from No. 32 oil passage L32, the oil supply to, and discharge from, each of the hydraulic clutches C1 through C4 are not affected. However, at the fourth speed, the hydraulic oil is supplied to the second speed hydraulic clutch C2 and, consequently, the speed is downshifted from the fourth speed to the second speed. Therefore, at the fourth speed, the second servo control valve 28 is urged leftwards by the output pressure of the second pressure regulating valve 14$_2$ and the output pressure of the second solenoid valve 16$_2$. Thus, even if one of the output pressures does not rise to a normal value after the restoration of the hydraulic pressure, the second servo control valve 28 is arranged to be surely switched to the left position.

In the "N" position of the manual valve 11, No. 2 oil passage L2, No. 16 oil passage L16, No. 17 oil passage L17, No. 27 oil passage L27, No. 29 oil passage L29, and No. 30 oil passage L30 are all opened to atmosphere, and all of the hydraulic clutches C1 through C4 are disengaged. Further, in the "P" position, No. 27 oil passage L27 is connected to No. 1 oil passage L1, and the servo valve 15 is switched to the reverse running position by the inputting of the line pressure via the first servo control valve 27 and No. 28 oil passage L28. In the "P" position, however, the connection between No. 16 oil passage L16 and No. 29 oil passage L29 is shut off to thereby open No. 16 oil passage L16 to atmosphere. There is therefore no possibility that the reverse transmission train GR is established.

The fluid torque converter 2 contains therein a lock-up clutch 2a. In the hydraulic oil circuit there is provided a lock-up control portion 29 for controlling the operation of the lock-up clutch 2a with the hydraulic oil to be supplied from the regulator 18 via No. 34 oil passage L34 operating as the working oil.

The lock-up control portion 29 is made up of: a shift valve 30 which controls to switch on and off the lock-up clutch 2a; a changeover valve 31 which switches the engaged condition of the lock-up clutch 2a at the time of being switched on between a locked up condition in which no slipping occurs and a slipping condition; and a pressure regulating valve 32 which controls to increase or decrease the engaging force in the slipping condition.

The shift valve 30 is switchable between the following two positions, i.e.: a right position in which No. 34 oil passage L34 is connected to No. 35 oil passage L35 which is communicated with a backpressure chamber of the lock-up clutch 2a and in which No. 36 oil passage L36 which is communicated with an internal space of the fluid torque converter 2 is connected, via a throttled portion 30a, to No. 37 oil passage L37 for oil discharge; and a left position in which No. 34 oil passage L34 is connected to No. 38 oil passage L38 which is communicated with the changeover valve 31 and also to No. 36 oil passage L36 via the throttled portion 30a, and in which No. 35 oil passage L35 is connected to No. 39 oil passage L39 which is communicated with the pressure regulating valve 32. The shift valve 30 is controlled by the fourth solenoid valve $16_4$. The fourth solenoid valve $16_4$ is constituted by a two-way valve which opens to atmosphere No. 40 oil passage L40 which is connected to No. 24 oil passage L24 on the output side of the modulator valve 19 via a throttle $16_4a$. The shift valve 30 is urged to the left position by the hydraulic pressure in No. 24 oil passage L24, i.e., by the modulator pressure, and is urged to the right position by a spring 30b and the hydraulic pressure in No. 40 oil passage L40. When the fourth solenoid valve $16_4$ is closed and the hydraulic pressure in No. 40 oil passage L40 is boosted to the modulator pressure, the shift valve 30 is switched to the right position. When the fourth solenoid valve $16_4$ is opened and the hydraulic pressure in No. 40 oil passage L40 is lowered to the atmospheric pressure, the shift valve 30 is switched to the left position.

The changeover valve 31 is switchable between the following two positions, i.e., a right position in which No. 41 oil passage L41 which is communicated with the internal space of the fluid torque converter 2 is connected to No. 42 oil passage L42 which is communicated with a left end oil chamber of the pressure regulator valve 32, and a left position in which No. 42 oil passage L42 is opened to atmosphere and in which No. 38 oil passage L38 is connected to No. 36 oil passage L36. The changeover valve 31 is urged to the right position by a spring 31a and is urged to the left position by the hydraulic pressure in No. 43 oil passage L43 which is connected to the right-end oil chamber.

The pressure regulating valve 32 is switchable between the following two positions, i.e., a right position in which No. 39 oil passage L39 is connected to No. 34 oil passage L34 and in which No. 41 oil passage L41 is connected to No. 37 oil passage L37 via a throttle 32a, and a left position in which the connection between No. 39 oil passage L39 and No. 34 oil passage L34 is shut off and connect No. 39 oil passage L39 to a throttled oil discharge port 32b, and in which the connection between No. 41 oil passage L41 and No. 37 oil passage L37 is shut off. The pressure regulating valve 32 is urged rightwards by a spring 32c and the hydraulic pressure in No. 42 oil passage L42, and is urged leftwards by the hydraulic pressure in No. 39 oil passage L39 and the hydraulic pressure in No. 43 oil passage L43. Here, let the pressure receiving area to receive the hydraulic pressure in No. 39 oil passage L39 and the pressure receiving area to receive the hydraulic pressure in No. 42 oil passage L42 be both s1, the pressure receiving area to receive the hydraulic pressure in No. 43 oil passage L43 be s2, the hydraulic pressures in No. 39 oil passage L39, No. 42 oil passage L42 and No. 43 oil passage L43 be Pa, Pb and Pc, respectively, and the urging force of the spring 32c be F. Then, we have $$s1 \cdot Pb + F = s1 \cdot Pa + s2 \cdot Pc$$
$$Pb - Pa = (s2 \cdot Pc - F)/s1$$

The differential pressure between the hydraulic pressure in No. 42 oil passage L42 and the hydraulic pressure in No. 39 oil passage L39 is increased or decreased depending on the hydraulic pressure in No. 43 oil passage L43.

No. 43 oil passage L43 is connected, in the right position of the changeover valve 13, to No. 25 oil passage L25 on the output side of the first solenoid proportional valve $17_1$ and, in the left position of the changeover valve 13, to No. 26 oil passage L26 on the output side of the second solenoid proportional valve $17_2$. In this manner, the changeover valve 31 and the pressure regulating valve 32 are controlled by the first solenoid proportional valve $17_1$ at the time of the first and the third speeds in which the changeover valve 13 is in the right position, and by the second solenoid proportional valve $17_2$ at the time of the second and the fourth speeds in which the changeover valve 13 is in the left position.

When the shift valve 30 is in the right position, the working oil from No. 34 oil passage L34 is supplied to the back pressure chamber of the lock-up clutch 2a via the shift valve 30 and No. 35 oil passage L35. Also, the internal space of the fluid toque converter 2 is connected to No. 37 oil passage L37 via No. 41 oil passage L41 and the pressure regulating valve 32 as well as via No. 36 oil passage L36 and the throttled portion 30a of the shift valve 30. Due to the oil discharge from the internal space via No. 37 oil passage L37, the internal pressure in the internal space is lowered, whereby the lock-up clutch 2a becomes a condition of being switched off, i.e., in a condition in which the engagement is released.

When the shift valve 30 is switched to the left position, the back pressure chamber of the lock-up clutch 2a is connected to No. 39 oil passage L39 via No. 35 oil passage L35 and the shift valve 30. While the changeover valve 31 is in the right position, the internal space of the fluid torque converter 2 is connected to No. 34 oil passage L34 via No. 36 oil passage L36 and the throttled portion 30a of the shift valve 30, as well as to No. 42 oil passage L42 via No. 41 oil passage L41 and the changeover valve 31. The differential pressure between the internal pressure in the internal space and the internal pressure in the back pressure chamber can be controlled for increase or decrease by that hydraulic pressure in No. 43 oil passage L43 which is inputted to the pressure regulating valve 32. In this manner, the lock-up clutch 2a is engaged, in a slipping condition, with an engaging force corresponding to the output pressure of the first solenoid proportional valve $17_1$ or the second solenoid proportional valve $17_2$.

When the hydraulic pressure in No. 43 oil passage L43 has become a predetermined value and above whereby the changeover valve 31 is switched to the left position, No. 42 oil passage L42 is opened to atmosphere and consequently the pressure regulating valve 32 is switched to, and retained in, the left position. The back pressure chamber of the lock-up clutch 2a thus remains connected to the oil discharge port 32b of the pressure regulating valve 32 via No. 35 oil passage L35, the shift valve 30, and No. 39 oil passage L39. On the other hand, the hydraulic oil is supplied from No. 34 oil passage L34 to the internal space of the fluid torque converter 2 via the shift valve 30, No. 38 oil passage L38, the changeover valve 31, and No. 36 oil passage L36. Further, since the connection between No. 41 oil passage L41 and No. 37 oil passage L37 is shut off by the switching of the pressure regulating valve 32 to the left position, the internal pressure inside the internal space is maintained at a relatively high pressure that is set by a check valve 33 which is connected to No. 41 oil passage L41. The lock-up clutch 2a is thus engaged in the locked up condition.

In the figure, numeral 34 denotes an oil cooler interposed in No. 37 oil passage L37, numeral 35 denotes a check valve for the oil cooler, numeral 36 denotes a throttle member which is interposed in a lubricating oil passage LB which supplies leaked oil from the regulator 18 to lubricated portions in each of the shafts 3, 5, 7 of the transmission.

An explanation will now be made about the control of the first and second solenoid proportional valves $17_1$, $17_2$ at the time of downshifting. In the explanations to be made hereinbelow, the following definitions are made. Namely, the output pressure of the solenoid proportional valve which controls the hydraulic pressure of the hydraulic clutch on the engaging side to be engaged at the time of downshifting is defined to be ON pressure, and the output pressure of the solenoid proportional valve which controls the hydraulic pressure of the hydraulic clutch on the disengaging side to be disengaged at the time of downshifting is defined to be OFF pressure.

Figure 6:
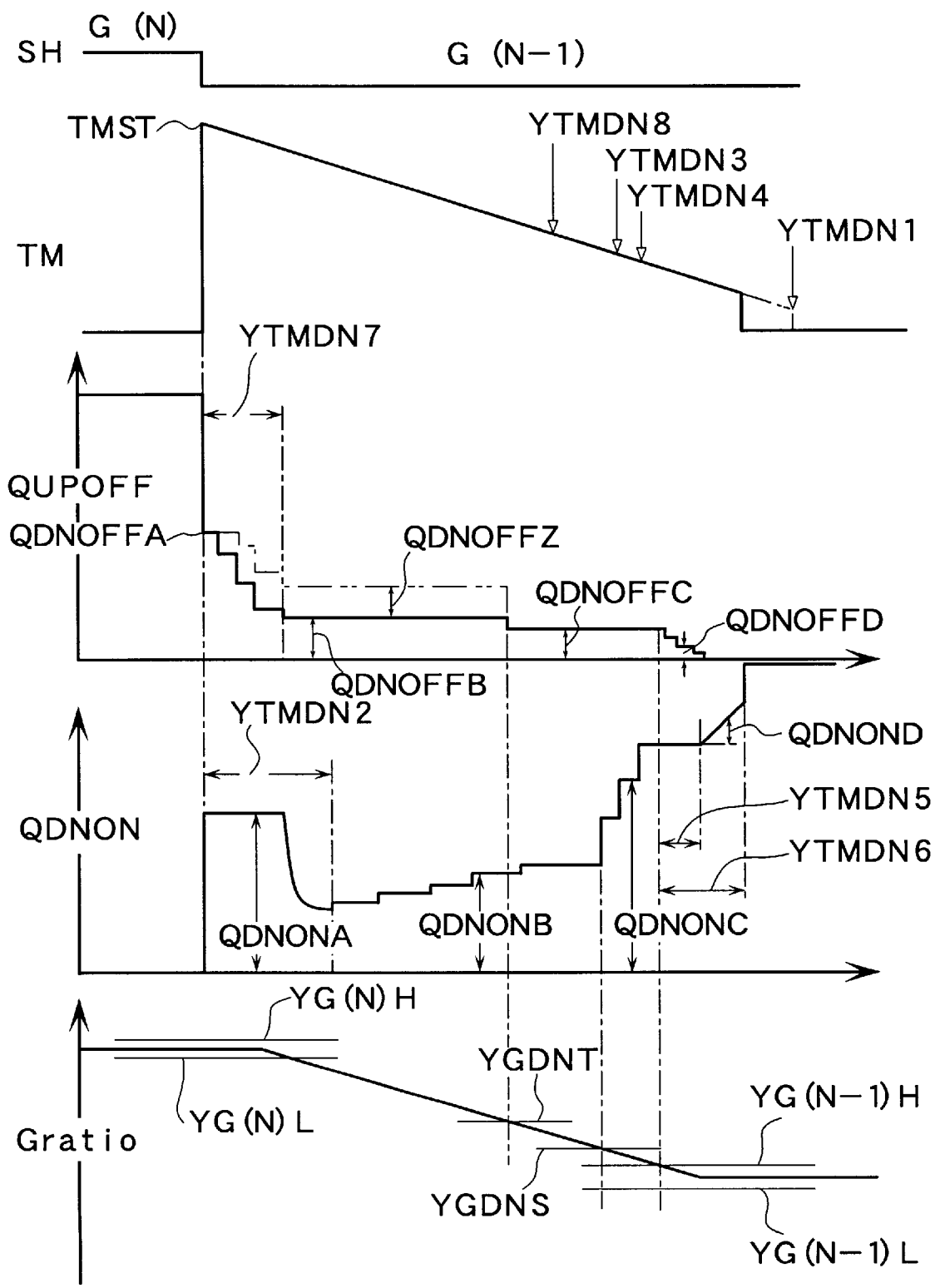
FIG. 6 is a time chart to show the changes in ON pressure, OFF pressure, and "Gratio" at the time of downshifting.
Figure 7:
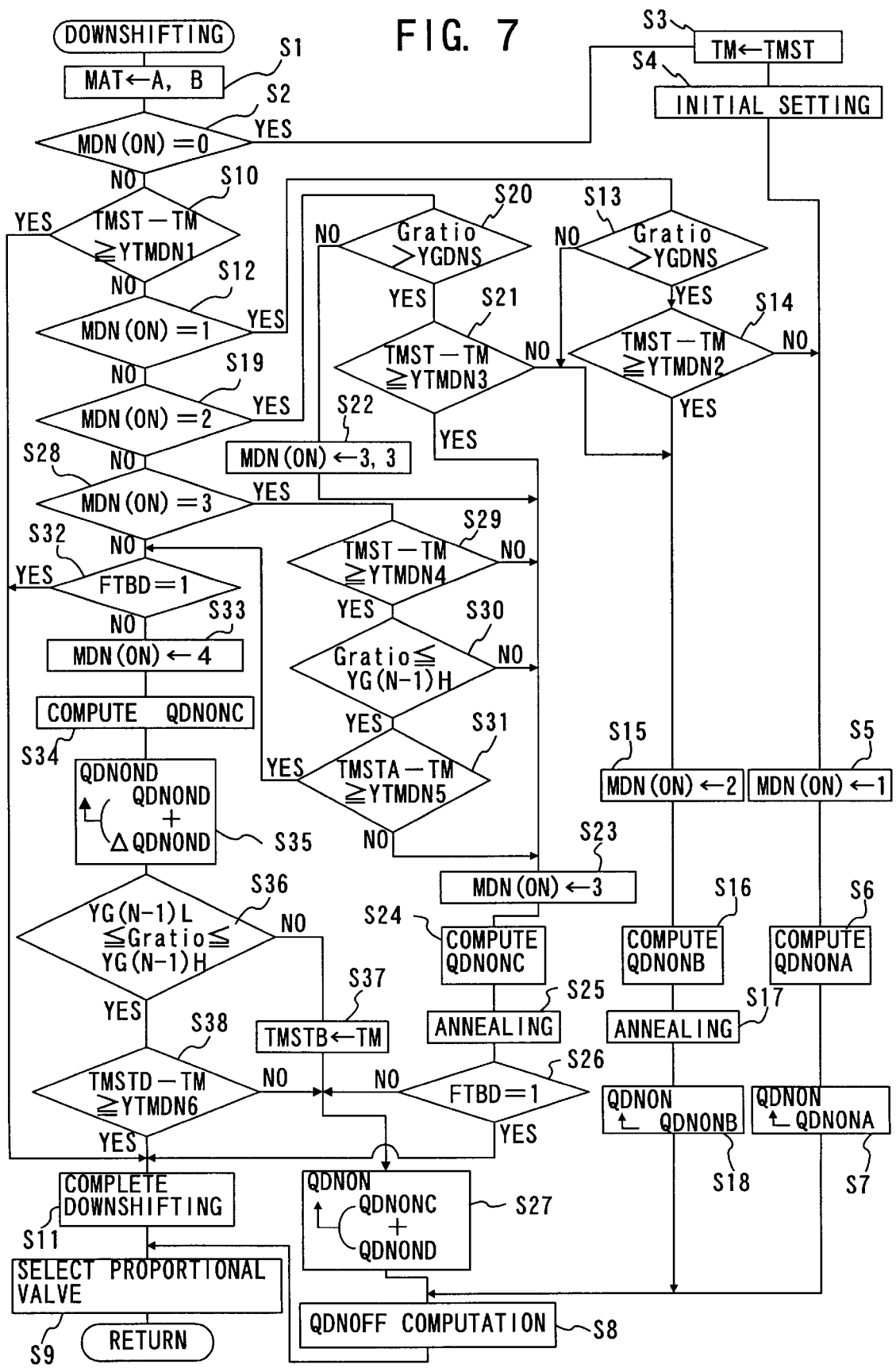
FIG. 7 is a flow chart to show the control at the time of downshifting.

The downshifting control is performed in the procedures shown in FIG. 7 by using a proportional valve monitor values MAT which show the relationship in magnitude of the output pressure of the first solenoid proportional valve $17_1$ and the second solenoid proportional valve $17_2$ as shown in FIG. 5A, and downshifting monitor values MDN which show the control mode of the ON pressure and the control mode of the OFF pressure at the time of downshifting as shown in FIG. 5B. Details thereof are explained with reference to FIG. 6 in which the changes in the ON pressure, OFF pressure, and the input/output speed ratio of the transmission "Gratio" (Nout/Nin) at the time of downshifting are schematically shown. "Gratio" varies to some degree depending on the pulsations, noises, or the like, of speed detecting pulses. However, if the hydraulic clutches are completely coupled or engaged, it falls within a range between a predetermined upper limit value YG(N)H and a lower limit value YG(N)L which are based on the gear ratio of each of the speed stages.

The downshifting control is started when the speed stage designation signal SH is switched to a signal which designates a lower speed stage G(N–1) than the speed stage G(N) that is now being established. In the downshifting control, MAT is first set to "A,B" in step S1. When MAT has thus been set, the changeover valve 13 is switched to a position which is different from the present position. Then, a discrimination is made in step S2 whether the value of MDN on the ON side (MDN(ON)) is "0" or not. Since MDN is initially set to "0,0", a judgement of "YES" is made in step S2. The program thus proceeds to step S3, in which TM is set to TMST. Further, in step S4, initial setting is made of various values to be used in the operation (or computation) of the ON pressure and the OFF pressure. Then, the program proceeds to step S5, in which a setting of MDN(ON)=1 is made. Further, in step S6, a value QDNONA of the ON pressure in the response pressure mode is set to an appropriate value depending on the vehicle speed and the throttle opening. The value QDNONA decreases with the lapse of time. Then, in step S7, a command value QDNON of the ON pressure is set to QDNONA, and a computation processing of the command value QDNOFF of the OFF pressure to be described hereinafter is performed in step S8. Thereafter, the program proceeds to step S9, in which the selection processing of proportional valves is performed in the following manner. Namely, between the solenoid proportional valves $17_1$, $17_2$, a command value of the output pressure of the solenoid proportional valve which controls the hydraulic pressure of a hydraulic clutch on the engaging side in the speed change at this time is made to be QDNON, and a command value of the output pressure of the solenoid proportional valve which controls the hydraulic pressure of a hydraulic clutch on the disengaging side is made to be QDNOFF. The downshifting control processing of the first time is thus completed.

In the next downshifting control processing, since the setting of MDN(ON)=1 has already been made in step S5 last time, a judgement of "NO" is made in step S2. At this time, the program proceeds to step S10, in which a discrimination is made whether the time of lapse from the start of downshifting (TMST–TM) has reached a predetermined time YTMDN1. The value YTMDN1 is set to a value which is slightly longer than an ordinary time required for downshifting. When TMST–TM≧YTMDN1, a judgement is made that the downshifting control has failed, and the program thus proceeds to step S11. In this step, there is performed a downshifting completion processing in which MAT is set to "0,B" (at the time of downshifting from the third speed to the second speed) or to "A,0" (at the time of downshifting other than from the third speed to the second speed). Further, MDN is reset to "0,0", and TM is reset to zero. When MAT is set to "0,B" or "A,0" in this processing, the positions of the first and the second shift valves $12_1$, $12_2$ are switched to the condition of performing the downshifting. The hydraulic pressure in the hydraulic clutch on the engaging side becomes the line pressure, and the hydraulic pressure in the hydraulic clutch on the disengaging side becomes atmospheric.

If TMST–TM<YTMDN1, the program proceeds to step S12 and a discrimination is made whether MDN(ON)=1 or not. In the second downshifting control processing, since MDN(ON)=1, a judgement of "YES" is made in step S12. The program thus proceeds to step S13, in which a discrimination is made whether "Gratio" has exceeded a predetermined value YGDNS or not. If "Gratio">YGDNS, the program proceeds to step S14, in which a discrimination is made whether the time of lapse from the start of downshifting (TMST–TM) has reached a predetermined time YTMDN2. If TMST–TM<YTMDN2, the program proceeds to step S5 and following steps to thereby perform the control of the ON pressure in the response pressure mode.

When "Gratio"≦YGDNS or TMST–TM≧YTMDN2, the program proceeds to step S15, in which a setting of MDN (ON)=2 is made, and then proceeds to step S16, in which the value QDNONB of the ON pressure in a low pressure correction mode is set to an appropriate value depending on the vehicle speed and the throttle opening. In step S17, there is performed an annealing processing in which QDNONB is gradually changed from QDNONA to a value to be set as above. Then, in step S18, QDNON is set to QDNONB to thereby start the control of the ON pressure in the low pressure correction mode.

In the next downshifting control processing, since the setting of MDN(ON)=2 has already been made in step S15 last time, a judgement of "NO" is made in step S12. The program thus proceeds to step S19 for making a discrimination as to whether MDN(ON)=2 or not, and a judgement of "YES" is made therein. At this time, the program proceeds to step S20 and a discrimination is made whether "Gratio" has exceeded YGDNS or not. If "Gratio">YGDNS, the program proceeds to step S21, and a discrimination is made whether the time of lapse from the start of downshifting (TMST–TM) has reached a predetermined value YTMDN3. If TMST–TM<YTMDN3, the program proceeds to step S15 and following steps to continue the control in the low pressure correction mode.

Once "Gratio"≦YGDNS, MDN is set to "3,3" in step S22 and the program then proceeds to step S23. If the condition of TMST−TM≧YTMDN3 is satisfied while "Gratio">YGDNS, the program proceeds directly to step S23, in which a setting of MDN(ON)=3 is made. Then, in step S24, a standard (reference) value QDNONC of the ON pressure in a synchronous mode is set to an appropriate value depending on the vehicle speed and the throttle opening. In step S25, an annealing processing to gradually change QDNONC from QDNONB to the above-described value is performed. Then, the program proceeds to step S26, in which a check is made of a value of a flag FTBD which is set to "1" when the speed stage designating signal SH is switched, during the downshifting control, to a signal specifying a speed stage G(N−2) of further lower speed, as explained hereinafter. Then, if FTBD=0, the program proceeds to step S27, in which QDNON is set to a value which is obtained by adding QDNOND to QDNONC. The value QDNOND is set to zero in the initial setting and, therefore, the condition becomes QDNON=QDNONC. The control of the ON pressure in the synchronous mode is thus started.

In the next downshifting control processing, since the setting of MDN(ON)=3 has already been made in step S23 last time, a judgement of "NO" is made in step S19. The program thus proceeds to step S28 for making a discrimination as to whether MDN(ON)=3 or not, and a judgement of "YES" is made therein. At this time, the program proceeds to step S29, in which a discrimination is made whether the time of lapse from the start of downshifting (TMST−TM) has reached a predetermined time YTMDN4. If TMST−TM<YTMDN4, the program proceeds to step S23 and following steps and the control in the synchronous mode is continued.

Once TMST−TM≧YTMDN4, the program proceeds to step S30, in which a discrimination is made whether "Gratio" has fallen below that upper limit value YG(N−1)H for judging the engagement of hydraulic clutch which is set based on the gear ratio of the speed stage to be established after speed changing. When "Gratio"≦YG(N−1)H, the program proceeds to step S31, in which, by using a timer value TMSTA which is set to a value of TM at the time when a condition of "Gratio"≦YG(N−1)H has been satisfied, a discrimination is made whether the time of lapse from the point of time when the condition of "Gratio"≦YG(N−1)H has been satisfied (TMSTA−TM) has reached a predetermined time YTMDN5. Then, when "Gratio">YG(N−1)H or TMSTA−TM<YTMDN5, the program proceeds to step S123 and following steps, and the control in the synchronous mode is continued. Once TMSTA−TM≧YTMDN5, the program proceeds to step S32 and a discrimination is made whether FTBD=1 or not. If FTBD=0, a setting of MDN (ON)=4 is made in step S33 and then QDNONC is set to an appropriate value in step S34 depending on the vehicle speed and the throttle opening. Further, in step S35, QDNOND is set to a value which is obtained by adding ΔQDNOND to the previous value of QDNOND. Then, in step S36, a discrimination is made whether "Gratio" lies within a range of the upper limit value YG(N−1)H and the lower limit value YG(N−1)L for judging the engagement of hydraulic clutch, which values are set based on the gear ratio of the speed stage to be established after speed changing. If the result of this discrimination is "NO", TMSTB is set in step S37 to the value of TM at that time, and the program then proceeds to step S27. In this case, since QDNOND increases by ΔQDNOND by the operation (or computation) in step S35, QDNON to be obtained in step S27 also gradually increases, and the control of the ON pressure in the end mode is started.

In the next downshifting control processing, since the setting of MDN(ON)=4 has already been made in step S33 last time, a judgement of "NO" is made in step S28. The program thus proceeds to step S32 and following steps and the control in the end mode is continued. Then, when a judgement of "YES" is made in step S36, the program proceeds to step S38. In this step, a discrimination is made whether the time in which "Gratio" continuously lies within the range of YG(N−1)H and YG(N−1)L, i.e., the time of duration of the condition of engagement completion of the hydraulic clutch on the engaging side (TMSTB−TM) has reached a predetermined time YTMDN6. Once TMSTB−TM≧YTMDN6, the program proceeds to step S11 and a downshifting completion processing is performed.

Figure 8:
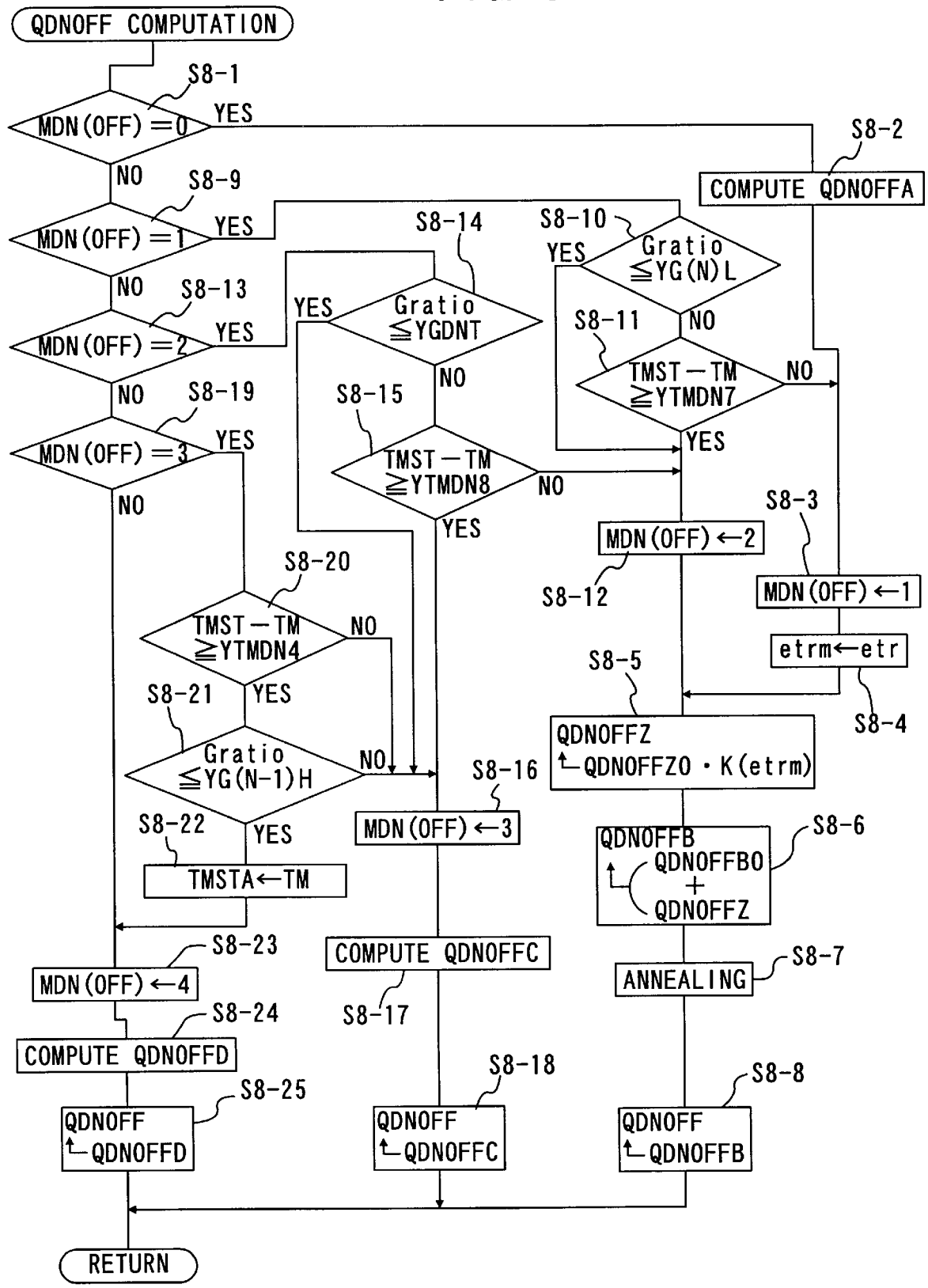
FIG. 8 is a flow chart to show the contents of control in step S8 in FIG. 7.

Details of operational processing of QDNOFF in step S8 are shown in FIG. 8. First, in step S8-1, a discrimination is made whether MDN(OFF)=0 or not. Since MDN has been set to "0,0" in the first downshifting control processing, a judgement of "YES" is made in step S8-1. The program thus proceeds to step S8-2, in which an initial value QDNOFFA of the OFF pressure in the initial pressure mode is set to an appropriate value depending on the vehicle speed and the throttle opening. Then, in step S8-3, a setting of MDN (OFF)=1 is made and, in step S8-4, a speed ratio "etr" of the torque converter 2 (rotational speed of input shaft 3/rotational speed of engine) at that time is stored in memory as "etrm". Then, the program proceeds to step S8-5, in which there is computed a boosting correction value QDNOFFZ. This boosting correction value QDNOFFZ varies with a degree of development (or progress) of speed change of the engine rotational speed at the time of start of downshifting, which degree of development being dependent on an increase in the rotational speed of the engine due to slipping in the fluid torque converter 2. The value QDNOFFZ is computed by multiplying a reference (standard) value QDNOFFZO depending on the throttle opening by a speed change developing degree function K which is obtained by a functional operation with "etrm" as a parameter. The function K will be described in detail hereinafter. When QDNOFFZ has been computed, the program proceeds to step S8-6, in which QDNOFFB which is a value of the OFF pressure in a low pressure holding mode is set to a value which is obtained by adding QDNOFFZ to a reference value QDNOFFBO depending on the throttle opening. Then, in step S8-7, an annealing processing is performed for gradually decreasing QDNOFFB from QDNOFFA down to a value to be set as described above. Thereafter, in step S8-8, QDNOFF is set to QDNOFFB. In this manner, there is started a control in the initial pressure mode in which the OFF pressure is gradually decreased from QDNOFFA.

In the next downshifting control processing, since the setting of MDN(OFF)=1 has already been made in step S8-3 last time, a judgement of "NO" is made in step S8-1. The program thus proceeds to step S8-9 for discriminating as to whether MDN(OFF)=1 or not and a judgement of "YES" is made therein. At this time, the program proceeds to step S8-10, in which a discrimination is made whether "Gratio" has fallen below that lower limit value YG(N)L for judging the engagement of clutch which is set based on the gear ratio of the speed stage established before speed changing. If "Gratio">YG(N)L, a discrimination is made in step S8-11 whether the time of lapse from the start of downshifting (TMST−TM) has reached a predetermined time YTMDN7. While TMST−TM<YTMDN7, the program proceeds to step S8-3 and following steps, and the control in the initial pressure mode is continued. When "Gratio"≦YG(N)L or TMST−TM≧YTMDN7, a setting of MDN(OFF)=2 is made in step S8-12 and the program proceeds to step S8-5 and following steps. A control of the OFF pressure in the low pressure holding mode is started.

In the next downshifting control processing, since the setting of MDN(OFF)=2 has already been made last time in step S8-12 last time, a judgement of "NO" is made in step S8-9. The program thus proceeds to step S8-13 for making a judgement as to whether MDN(OFF)=2 or not, and a judgement of "YES" is made therein. At this time, the program proceeds to step S8-14, in which a discrimination is made whether "Gratio" has fallen below a predetermined value YGDNT. If "Gratio">YGDNT, a discrimination is made in step S8-15 whether a time of lapse from the start of downshifting (TMST−TM) has reached a predetermined time YTMDN8. While TMST−TM<YTMDN8, the program proceeds to step S8-12 and following steps and the control in the low pressure holding mode is continued. Then, when "Gratio"≦YGDNT or TMST−TM≧YTMDN8, a setting of MDN(OFF)=3 is made in step S8-16. The program then proceeds to step S8-17, in which a value QDNOFFC of the OFF pressure in the tail mode is set to an appropriate value depending on the throttle opening. Then, in step S8-18, QDNOFF is set to QDNOFFC, and the control is started in the tail mode in which the OFF pressure is held in a lower pressure than in the low pressure holding mode.

In the next downshifting control processing, since the setting of MDN(OFF)=3 has already been made in step S8-16 last time, a judgement of "NO" is made in step S8-13. The program thus proceeds to step S8-19 for making a discrimination as to whether MDN(OFF)=3 or not, and a judgement of "YES" is made therein. At this time, the program proceeds to step S8-20, in which a discrimination is made whether the time of lapse from the start of downshifting (TMST−TM) has reached a predetermined time YTMDN4. If TMST−TM≧YTMDN4, the program proceeds to step S8-21, in which a discrimination is made whether "Gratio" has fallen below YG(N−1)H or not. If TMST−TM <YTMDN4 or "Gratio">G(N−1)H, the program proceeds to step S8-16 and following steps, and the control in the tail mode is continued. Then, when TMST−TM≧YTMDN4 and also when "Gratio"≦YG(N−1)H, the program proceeds to step S8-22, in which the value of TM at that time is set to TMSTA which is used in a time counting processing in the above-described step S31. Then, in step S8-23, a setting of MDN(OFF)=4 is made and also, in step S8-24, the value QDNOFFD of the OFF pressure in the end mode is set to a value which gradually decreases from QDNOFFC. In step S8-25, QDNOFF is set to QDNOFFD, and the control of the OFF pressure in the end mode is performed.

The above-described speed change developing degree function K expresses a ratio of an increase amount in the rotational speed of the engine due to slipping o the fluid torque converter 2 at the time of starting of downshifting, to the change amount in the rotational speed of the engine when downshifting is carried out while the speed ratio etr of the fluid torque converter 2 is held at a standard (reference) value Yetr.

Here, let the gear ratio (Nin/Nout) of the established speed stage before downshifting be YG(N), and the gear ratio of the established speed stage after downshifting be YG(N−1). When downshifting is carried out while etr=Yetr is kept as it is, the rotational speed of the engine NeG(N) before downshifting and the rotational speed of the engine NeG (N−1) after downshifting become $$NeG(N)=Nout \cdot YG(N)/Yetr \quad (1)$$

$$NeG(N-1)=Nout \cdot YG(N-1)/Yetr \quad (2)$$

where the rotational speed of the output shaft 7 of the transmission is Nout (constant). If the actual etr at the time of starting of downshifting is etrm, the rotational speed of the engine Ne at this time becomes $$Ne=Nout \cdot YG(N)/etrm \quad (3)$$

The speed change developing degree function K is expressed by $$K=\{(Ne-NeG(N))/(NeG(N-1)/NeG(N)\} \quad (4)$$

If rearrangement is made by substituting formulas (1), (2) and (3) into formula (4), the following is obtained.

$$K=\{(Yetr/etrm-1)\}/\{(YG(N-1)/YG(N)-1\} \quad (5)$$

When the accelerator pedal is stepped slowly, if the vehicle speed does not change, only the rotational speed of the engine increases due to slipping in the fluid torque converter 2, with the result that rotational speed of the engine sometimes exceeds NeG(N) at the time of starting of downshifting. In such a case, when slipping occurs to the hydraulic clutch on the disengaging side after the starting of downshifting, the rotational speed of the input shaft 3 rapidly increases so as to approach the rotational speed of the engine that has already been increased, and the speed of decrease in "Gratio" becomes large. As a result, while the ON clutch pressure has not risen sufficiently, "Gratio" enters into the synchronous region, and the hydraulic clutch on the engaging side therefore can no longer be engaged at the time of synchronization. Therefore, in the present embodiment, the following arrangement is employed. Namely, the boosting correction value QDNOFFZ is operated (or computed) by using the speed change developing degree function K to be obtained by formula (5) with "etrm" as a parameter, and the value QDNOFFB is added by the amount of QDNOFFZ. The decrease in "Gratio" is thereby restrained by the engaging force of the hydraulic clutch on the disengaging side so that the hydraulic clutch on the engaging side can be sufficiently engaged at the time of synchronization. Since "etr" at the time of completion of speed change varies delicately with the operating conditions of the engine, it is preferable to replace the value of Yetr to be substituted into formula (5) depending on the operating conditions of the engine.

In the present embodiment, as shown in FIG. 7, if the speed stage designation signal SH is switched (or changed), during downshifting control from G(N) to G(N−1), to a signal to designate a speed stage which is a still lower speed stage G(N−2) to thereby make a setting of FTBD=1, the program proceeds from step S26 to step S11 when the control of the ON pressure in the low pressure correction mode has been completed. Further, when a setting of FTBD=1 is made during the control of the ON pressure in the synchronous mode, the program proceeds from step S32 to step S11 when the control in a synchronous mode has been completed. Downshifting completion processing is thus performed, whereby the downshifting control from G(N−1) to G(N−2) is started. Since the downshifting control from G(N) to G(N−1) is completed in this manner at an early time, the time required for the downshifting from G(N) to G(N−2) is shortened, resulting in an improved drivability.

Figure 9:
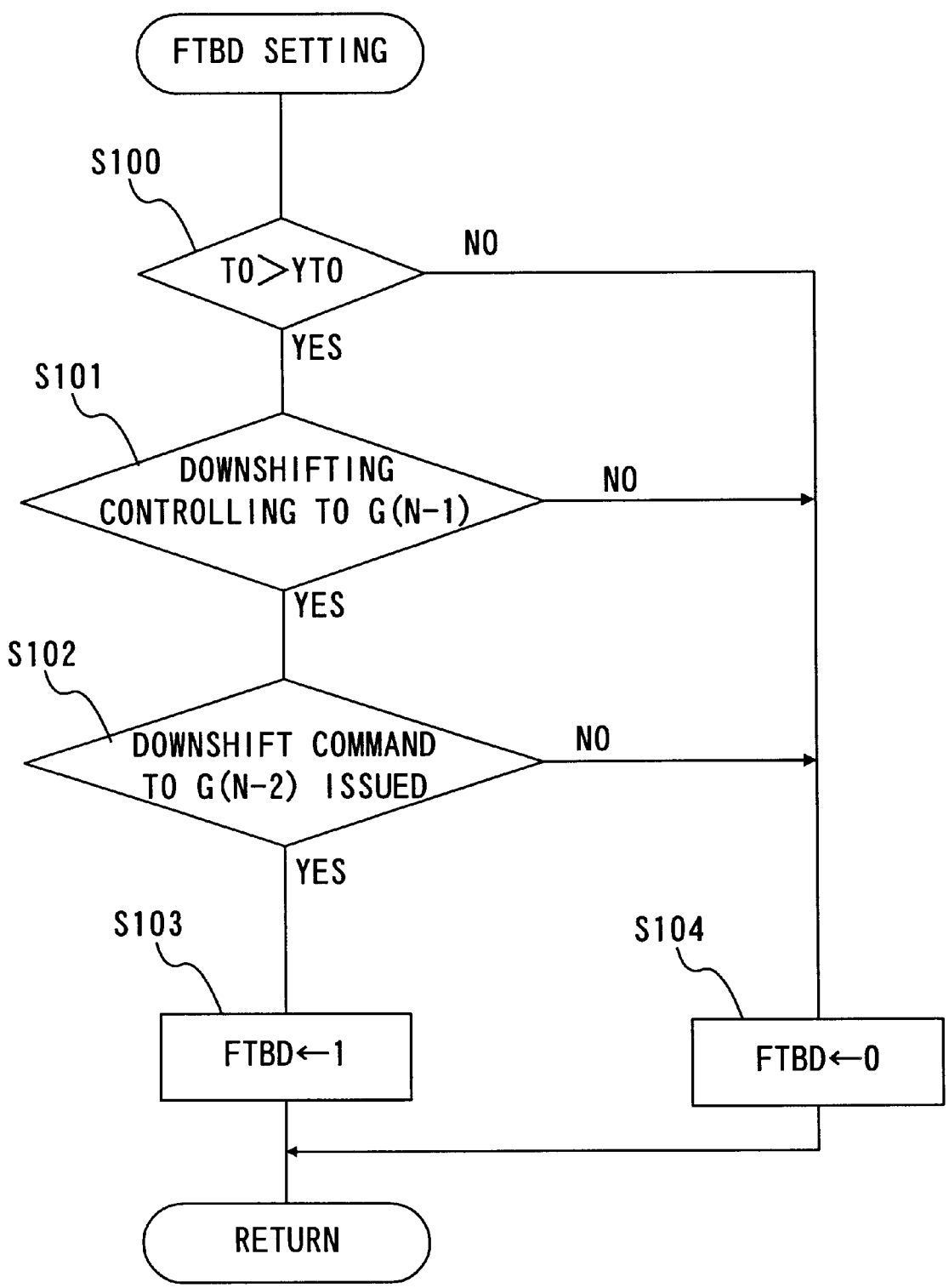
FIG. 9 is a flow chart to show the setting processing of FTBD to be used in the control in FIG. 7.

The FTBD setting processing is as shown in FIG. 9. First, in step S100, a discrimination is made as to whether the oil temperature TO of the transmission detected by the oil temperature sensor is above a predetermined value YTO or not. If TO≧YTO, a discrimination is made in step S101 to see whether it is in the process of controlling for downshifting to G(N−1) or not. If it is in the process of controlling for downshifting to G(N−1), a discrimination is made in step S102 to see whether a command to downshift to G(N-2) has been issued or not. If the command has been issued, a setting of FTBD=1 is made in step S103. Otherwise, a resetting of FTBD=0 is made in step S104.

The value YTO is set to such a temperature, e.g., about 30° C., as to cause a non-negligible delay in response until the actual hydraulic pressure in the hydraulic clutch on the engaging side rises to the ON pressure to be outputted by the solenoid proportional valve. If downshifting control from G(N) to G(N-1) is completed early at the time of a low oil temperature when TO<YTO is satisfied, the downshifting control from G(N-1) to G(N-2) is started while the actual hydraulic pressure of the hydraulic clutch for the speed stage G(N-1), which is to be engaged in this downshifting, has not sufficiently been risen. The hydraulic clutch is prematurely disengaged in this downshifting control, giving rise to an excessive engine racing. As a result, large speed change shocks occur at the time of downshifting to G(N-2). In the present embodiment, however, even if a command for downshifting from G(N-1) to G(N-2) is outputted during the downshifting control from G(N) to G(N-1) at the time of low oil temperature, the state of FTBD=0 is maintained. Therefore, the downshifting from G(N) to G(N-1) is performed in an ordinary manner. As a result, the actual hydraulic pressure in the hydraulic clutch for G(N-1) has already been sufficiently raised at the time of starting the downshifting from G(N-1) to G(N-2). The downshifting to G(N-2) can thus be performed without giving rise to an excessive engine racing.

In the above described embodiment, when FTBD=1, the ON pressure and the OFF pressure are switched to the values at the time of completion of downshifting in the course of the downshifting control to G(N-1), whereby the timing for completion of downshifting control to G(N-1) is accelerated. It may, however, be so arranged that, when FTDB=1, the speed of increasing the ON pressure and the speed of decreasing the OFF pressure are accelerated to thereby accelerate the timing for completion of the downshifting control. Also in this case, by prohibiting the setting of FTBD=1 at the time of low oil temperature, the occurrence of speed change shocks can be prevented.

As can be seen from the above-described explanations, according to the present invention, downshifting to a two-speed lower speed stage can be performed smoothly even at the time of low oil temperature, and the occurrence of speed change shocks can be prevented.

It is readily apparent that the above-described control apparatus for a hydraulically operated vehicular transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for a hydraulically operated vehicular transmission having a plurality of speed stages to be established by a selecting operation of a plurality of hydraulic engaging elements, said apparatus comprising:

means for controlling stepwise speed changing for downshifting one stage at a time such that during downshifting control to one speed stage which is one stage lower, upon receipt of a downshifting command to another speed stage which is one stage lower than said one speed stage, a start of downshifting control to said another speed stage is delayed until the downshifting control to said one speed stage is completed; and means for switching a control mode which performs a control to accelerate the time of completion of the downshifting control to said one speed stage, said control being made upon receipt of that downshifting command to said another speed stage which is issued during the downshifting control to said one speed stage;

characterized in that said control apparatus further comprises:

oil temperature detecting means for detecting a temperature of oil in the transmission; and prohibiting means for prohibiting the control by said means for switching the control mode when the detected oil temperature is below a predetermined value.

* * * * *